(12) United States Patent
Kato et al.

(10) Patent No.: US 10,848,483 B2
(45) Date of Patent: Nov. 24, 2020

(54) SHARED TERMINAL, COMMUNICATION SYSTEM, AND DISPLAY CONTROL METHOD, AND RECORDING MEDIUM

(71) Applicants: Yoshinaga Kato, Kanagawa (JP); Katsuyuki Kaji, Tokyo (JP)

(72) Inventors: Yoshinaga Kato, Kanagawa (JP); Katsuyuki Kaji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 284 days.

(21) Appl. No.: 15/824,052

(22) Filed: Nov. 28, 2017

(65) Prior Publication Data

US 2018/0167377 A1 Jun. 14, 2018

(30) Foreign Application Priority Data

Dec. 8, 2016 (JP) .................................. 2016-238540
Nov. 21, 2017 (JP) .................................. 2017-223327

(51) Int. Cl.
*H04L 29/06* (2006.01)
*G06F 21/31* (2013.01)
*G06F 21/84* (2013.01)
*G06F 1/24* (2006.01)

(52) U.S. Cl.
CPC ............. *H04L 63/083* (2013.01); *G06F 1/24* (2013.01); *G06F 21/31* (2013.01); *G06F 21/84* (2013.01); *H04L 63/0853* (2013.01); *H04L 63/0876* (2013.01)

(58) Field of Classification Search
CPC ............. H04L 63/083; H04L 63/0853; H04L 63/0876; G06F 21/31; G06F 21/84; G06F 1/24

USPC .......................................................... 726/27
See application file for complete search history.

(56) References Cited

U.S. PATENT DOCUMENTS

| | | | | |
|---|---|---|---|---|
| 5,276,890 A * | 1/1994 | Arai | ....................... | G06F 9/461 713/1 |
| 5,684,998 A * | 11/1997 | Enoki | ................... | G06F 9/4418 713/310 |
| 5,956,048 A * | 9/1999 | Gaston | ................. | G06F 1/1626 345/530 |
| 6,504,575 B1 * | 1/2003 | Ramirez | ............... | G06F 3/0481 348/333.02 |

(Continued)

FOREIGN PATENT DOCUMENTS

JP    2002-351444    12/2002

*Primary Examiner* — Dant B Shafer Harriman
*Assistant Examiner* — Mahabub S Ahmed
(74) *Attorney, Agent, or Firm* — Harness, Dickey and Pierce, P.L.C.

(57) ABSTRACT

A shared terminal for displaying an image to be viewed by a plurality of users on a display is provided. The shared terminal includes circuitry to receive an instruction to turn on the shared terminal according to operation of a power switch, and determine whether login authentication and redisplay of a previously-displayed image are individually set. The previously-displayed image is an image that has been previously displayed when the circuitry receives an instruction to turn off the shared terminal. The circuitry further causes the display to redisplay the previously-displayed image in response to the instruction to turn on, based on a determination that the login authentication is not set and the redisplay of the previously-displayed image is set.

10 Claims, 21 Drawing Sheets

(56) References Cited

U.S. PATENT DOCUMENTS

| | | | | |
|---|---|---|---|---|
| 6,618,813 B1* | 9/2003 | Hsu | G06F 1/3203 | 713/310 |
| 7,711,990 B1* | 5/2010 | Nickolls | G06F 11/3648 | 714/37 |
| 7,920,701 B1* | 4/2011 | Cox | H04N 21/42646 | 380/200 |
| 8,261,090 B1* | 9/2012 | Matsuoka | H04L 63/102 | 713/186 |
| 8,819,489 B2* | 8/2014 | Patel | G06F 11/3648 | 714/30 |
| 9,038,126 B2* | 5/2015 | Ooki | G06F 21/316 | 726/1 |
| 9,183,606 B1* | 11/2015 | Paczkowski | G06F 21/57 | |
| 9,473,491 B1* | 10/2016 | Johansson | H04L 63/0838 | |
| 9,542,544 B2* | 1/2017 | Smith | G06F 21/32 | |
| 9,898,064 B2* | 2/2018 | Goda | G03G 15/5016 | |
| 10,198,980 B2* | 2/2019 | Choi | G09G 3/20 | |
| 10,515,137 B1* | 12/2019 | Sirota | G06F 40/106 | |
| 10,521,241 B1* | 12/2019 | Ha | G06F 9/442 | |
| 2003/0199267 A1* | 10/2003 | Iwasa | G06F 21/35 | 455/410 |
| 2004/0246236 A1* | 12/2004 | Hildebrandt | G08C 23/04 | 345/169 |
| 2007/0162779 A1* | 7/2007 | Downer | G06F 1/24 | 713/340 |
| 2007/0162785 A1* | 7/2007 | Downer | G06F 1/24 | 714/15 |
| 2008/0109886 A1* | 5/2008 | Matsumoto | G06F 21/552 | 726/5 |
| 2008/0250061 A1* | 10/2008 | Kim | G11B 27/11 | |
| 2008/0259071 A1* | 10/2008 | Nemoto | G06F 21/316 | 345/212 |
| 2009/0033992 A1* | 2/2009 | Ogiwara | G06F 21/608 | 358/1.15 |
| 2010/0033491 A1* | 2/2010 | Sugamata | G09G 3/344 | 345/530 |
| 2010/0064126 A1* | 3/2010 | Yi | G06F 9/4418 | 713/2 |
| 2010/0205659 A1* | 8/2010 | Suzuki | G06F 21/34 | 726/5 |
| 2011/0004749 A1* | 1/2011 | Bennetts | G06F 9/4406 | 713/100 |
| 2011/0149173 A1* | 6/2011 | Jang | H04N 21/44 | 348/739 |
| 2011/0161619 A1* | 6/2011 | Kaminski | G06F 12/1027 | 711/207 |
| 2011/0161620 A1* | 6/2011 | Kaminski | G06F 12/1009 | 711/207 |
| 2011/0167249 A1* | 7/2011 | Ahn | G06F 8/63 | 713/2 |
| 2011/0199623 A1* | 8/2011 | Okuyama | H04N 1/00408 | 358/1.9 |
| 2011/0212761 A1* | 9/2011 | Paulsen | G06T 15/005 | 463/25 |
| 2011/0243527 A1* | 10/2011 | Hayashi | G11B 19/02 | 386/241 |
| 2012/0050197 A1* | 3/2012 | Kemmochi | G06F 21/6209 | 345/173 |
| 2012/0233615 A1* | 9/2012 | Barrus | G06F 21/31 | 718/100 |
| 2013/0027413 A1* | 1/2013 | Jayavant | G06F 1/325 | 345/520 |
| 2013/0145137 A1* | 6/2013 | Sartorius | G06F 11/1441 | 713/1 |
| 2014/0040633 A1* | 2/2014 | Leleu | G06F 21/36 | 713/189 |
| 2014/0047470 A1* | 2/2014 | Janus | H04N 21/2541 | 725/30 |
| 2014/0115378 A1* | 4/2014 | Chin | G06F 11/0709 | 714/4.3 |
| 2014/0126016 A1* | 5/2014 | Namihira | H04N 1/32534 | 358/1.15 |
| 2014/0237609 A1* | 8/2014 | Sharp | G06F 21/53 | 726/26 |
| 2014/0258441 A1* | 9/2014 | L'Heureux | H04W 12/0602 | 709/217 |
| 2014/0283016 A1* | 9/2014 | Sambamurthy | G06F 21/31 | 726/19 |
| 2014/0310509 A1* | 10/2014 | Potlapally | G06F 11/1417 | 713/2 |
| 2014/0362167 A1* | 12/2014 | Young | H04N 7/15 | 348/14.08 |
| 2015/0002523 A1* | 1/2015 | Zeng | G06F 21/74 | 345/522 |
| 2015/0005904 A1* | 1/2015 | Seberger | G05B 19/0428 | 700/79 |
| 2015/0026552 A1* | 1/2015 | Horie | G06F 40/166 | 715/211 |
| 2015/0029089 A1* | 1/2015 | Kim | G06F 3/011 | 345/156 |
| 2015/0067775 A1* | 3/2015 | Cardone | H04L 63/0884 | 726/3 |
| 2015/0074615 A1* | 3/2015 | Han | H04W 12/06 | 715/863 |
| 2015/0077791 A1* | 3/2015 | Asai | H04N 1/00413 | 358/1.15 |
| 2015/0106739 A1* | 4/2015 | Tan | G06F 3/04886 | 715/750 |
| 2015/0124287 A1* | 5/2015 | Wen | G06F 9/441 | 358/1.15 |
| 2015/0154718 A1* | 6/2015 | Fuse | G06Q 50/01 | 715/753 |
| 2015/0195789 A1* | 7/2015 | Yoon | G06F 1/3262 | 345/173 |
| 2015/0279369 A1* | 10/2015 | Lee | H04N 21/431 | 704/275 |
| 2015/0281119 A1* | 10/2015 | Olkha | H04L 63/10 | 709/225 |
| 2015/0327070 A1* | 11/2015 | Chiu | G06F 21/35 | 455/411 |
| 2015/0332037 A1* | 11/2015 | Tse | G06K 9/00288 | 726/19 |
| 2016/0103477 A1* | 4/2016 | Park | G06F 1/3265 | 713/323 |
| 2016/0170477 A1* | 6/2016 | Flack | G06F 1/3296 | 713/323 |
| 2016/0246959 A1* | 8/2016 | Lee | G06F 21/51 | |
| 2016/0267287 A1* | 9/2016 | Kobayashi | G06F 3/04883 | |
| 2016/0335940 A1* | 11/2016 | You | G06F 3/14 | |
| 2016/0378422 A1* | 12/2016 | Kenjalkar | G06F 3/1423 | 726/6 |
| 2017/0010771 A1* | 1/2017 | Bernstein | G06F 1/165 | |
| 2017/0177190 A1 | 6/2017 | Inoue et al. | | |
| 2017/0269793 A1* | 9/2017 | Tan | G06F 3/0484 | |
| 2017/0269810 A1 | 9/2017 | Kanda et al. | | |
| 2017/0318146 A1* | 11/2017 | Peter | H04W 4/12 | |
| 2017/0323097 A9* | 11/2017 | Lee | H04N 21/4331 | |
| 2018/0053003 A1* | 2/2018 | Nair | H04W 12/02 | |
| 2018/0060175 A1* | 3/2018 | Kim | G06F 1/3212 | |
| 2018/0115740 A1* | 4/2018 | Kodama | H04L 67/12 | |
| 2019/0236299 A1* | 8/2019 | Son | A61B 5/02438 | |
| 2019/0286301 A1* | 9/2019 | Yang | G06F 3/167 | |

* cited by examiner

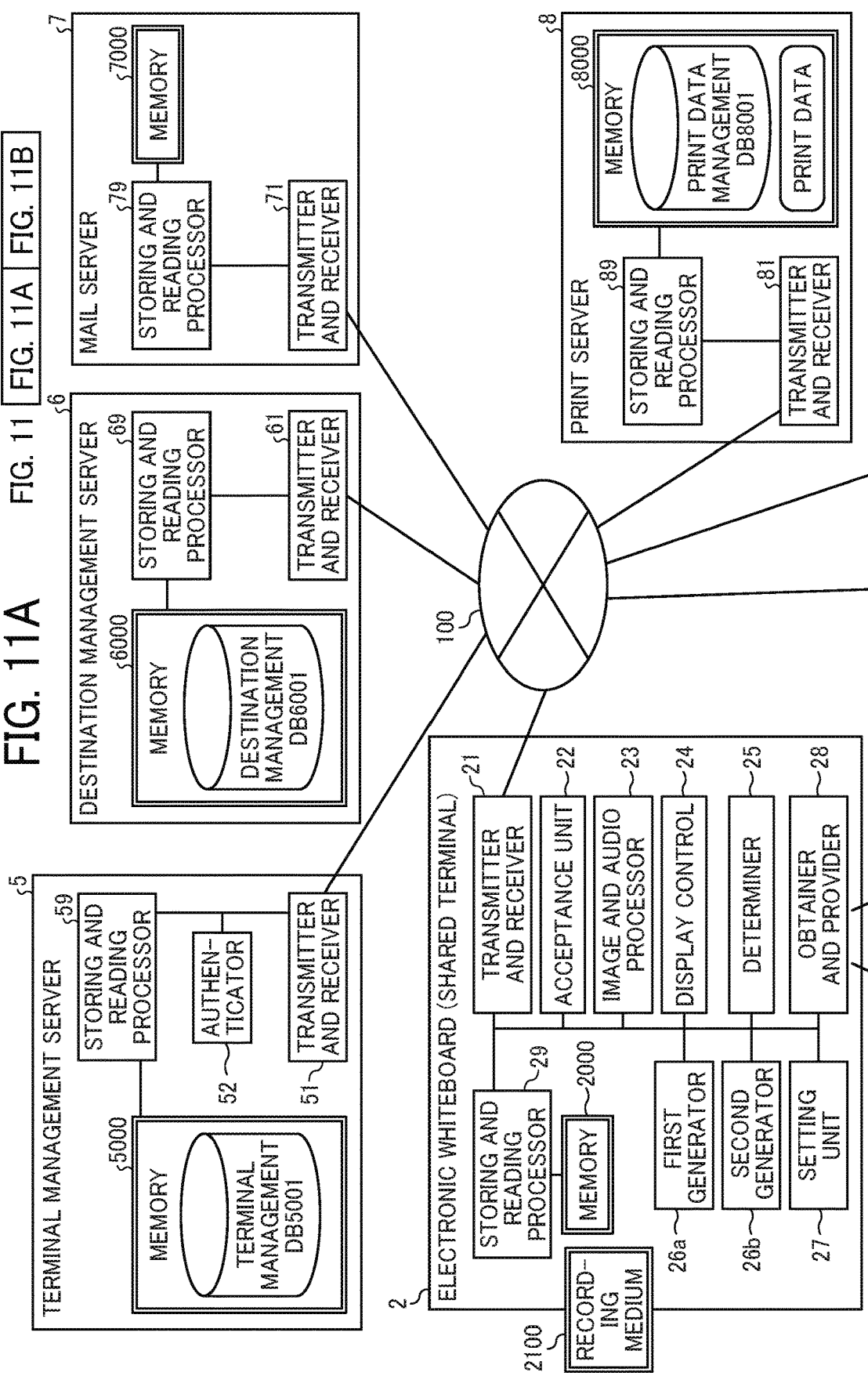

FIG. 12A

| TERMINAL ID (PRIVATELY-OWNED TERMINAL) | USER ID | USER |
|---|---|---|
| aaa | 10001 | Kato |
|  | 10002 | Jim |
| ... | ... | ... |

FIG. 12B

| USER ID | EMAIL ADDRESS |
|---|---|
| 10001 | aaa@xxx.co.jp |
| 10002 | bbb@xxx.co.jp |
| ... | ... |

FIG. 12C

| USER NAME (PRINT REQUESTER NAME) | FILE NAME | PRINT SETTING PARAMETER |
|---|---|---|
| Kato | 1001 | Color, A4, ... |
| Kato | 1002 | Monochrome, A4, ... |
| Jim | 2001 | Color, A3, ... |
| ... | ... | ... |

FIG. 14A  LOGIN SCREEN 170

FIG. 14B  ERROR NOTIFICATION SCREEN 180

FIG. 14C  DRAWING START SCREEN 190

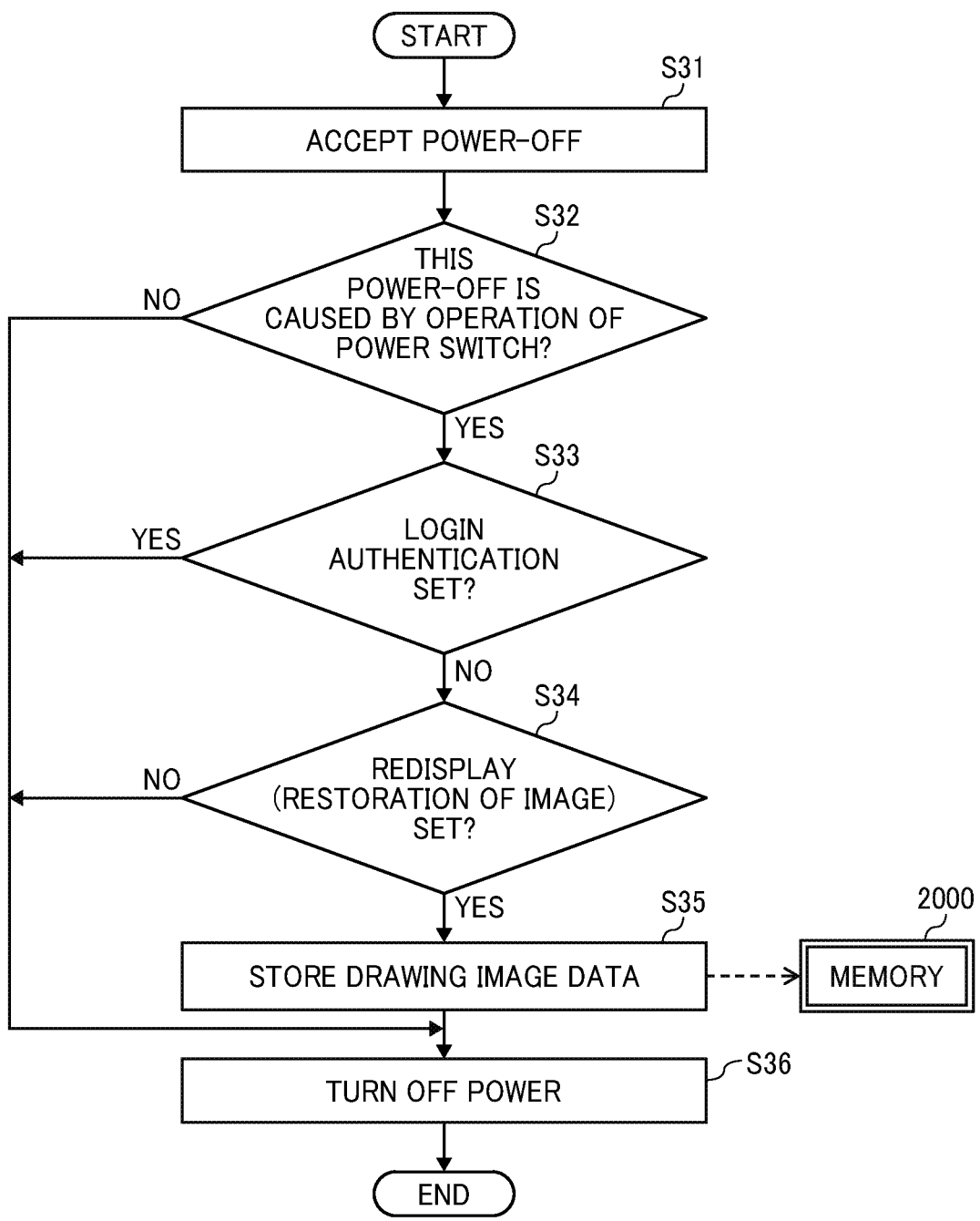

SHARED TERMINAL, COMMUNICATION SYSTEM, AND DISPLAY CONTROL METHOD, AND RECORDING MEDIUM

CROSS-REFERENCE TO RELATED APPLICATION

This patent application is based on and claims priority pursuant to 35 U.S.C. § 119(a) to Japanese Patent Application Nos. 2016-238540, filed on Dec. 8, 2016 and 2017-223327, filed on Nov. 21, 2017, in the Japan Patent Office, the entire disclosures of which are hereby incorporated by reference herein.

BACKGROUND

Technical Field

The present disclosure relates to a shared terminal, a communication system, a display control method, and a non-transitory recording medium.

Related Art

In recent years, electronic whiteboards each of which is shared by a plurality of users are disposed in various places such as meeting rooms in companies and classrooms in educational institutions. The electronic whiteboard is provided with a touch panel display of large size, on which a user draws an image with an electronic pen or his or her finger. This enables the users to conduct a meeting or a lecture while viewing the same image drawn by the user. Additionally, to improve security, the electronic whiteboard is provided with a login function, which only allows particular users who successfully logged in to use the electronic whiteboard.

SUMMARY

A shared terminal for displaying an image to be viewed by a plurality of users on a display is provided. The shared terminal includes circuitry to receive an instruction to turn on the shared terminal according to operation of a power switch, and determine whether login authentication and redisplay of a previously-displayed image are individually set. The previously-displayed image is an image that has been previously displayed when the circuitry receives an instruction to turn off the shared terminal. The circuitry further causes the display to redisplay the previously-displayed image in response to the instruction to turn on, based on a determination that the login authentication is not set and the redisplay of the previously-displayed image is set.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 11A and 11B are a schematic block diagram illustrating a functional configuration of the communication system, according to an embodiment;

FIG. 12A is a conceptual diagram illustrating a terminal management table, according to an embodiment;

FIG. 12B is a conceptual diagram illustrating a destination management table, according to an embodiment;

FIG. 12C is a conceptual diagram illustrating a print data management table according to an embodiment;

FIGS. 14A, 14B, 14C and 14D are illustrations each of which illustrates an example screen displayed with the display of the electronic whiteboard;

FIG. 17 is a flowchart illustrating a process of turning off the electronic whiteboard, according to an embodiment.

Figure 1:
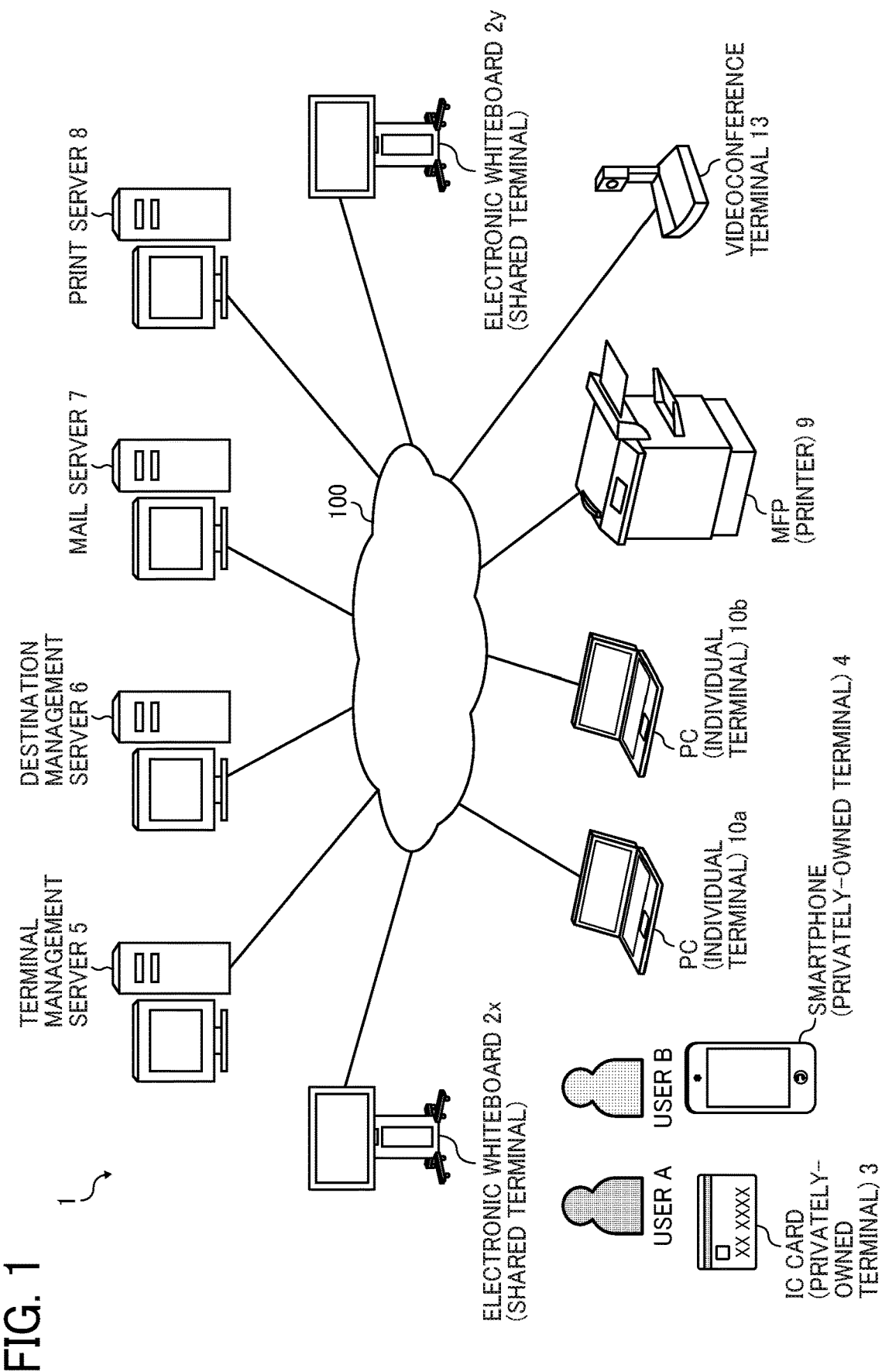
FIG. 1 is a schematic diagram illustrating a communication system according to an embodiment of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Referring to the drawings, a communication system 1 is described in detail according to an embodiment.

<Overview of System Configuration>

First, an overview of a configuration of the communication system 1 is described according to an embodiment. FIG. 1 is a schematic diagram illustrating the communication system 1 according to the embodiment.

As illustrated in FIG. 1, the communication system 1 of the embodiment includes an electronic whiteboard 2x, an electronic whiteboard 2y, an integrated circuit (IC) card 3, a smartphone 4, a terminal management server 5, a destination management server 6, a mail server 7, a print server 8, a multifunction peripheral, product or printer (MFP) 9, personal computers (PCs) 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smartphone 4 are communicable with one another using a near-distance communication technology in compliance with such as Near Field Communication (NFC) (Registered Trademark). The smartphone 4 may communicate with the electronic whiteboard 2 using the near-distance communication technology in compliance with such as Bluetooth (Registered Trademark).

One of the electronic whiteboard 2x and the electronic whiteboard 2y transmits or receives drawing image data representing a content drawn by a user ("drawing image data"), to or from the other one of the electronic whiteboard 2x and the electronic whiteboard 2y. That is, the content drawn at the electronic whiteboard 2x is displayed at the electronic whiteboard 2y, and the content drawn at the electronic whiteboard 2y is displayed at the electronic whiteboard 2x.

The electronic whiteboard 2 generates image data in Refined Printing Command Stream (RPCS) based on the drawing image data, and transmits the generated image data to the MFP 9 through the communication network 100. The MFP 9 prints a drawing image based on the image data received from the electronic whiteboard 2. In another example, the electronic whiteboard 2 generates image data in Portable Document Format (PDF) based on the drawing image data, and transmits an electronic mail attached with the generated image data to the PC 10 through the communication network 100. The PC 10 displays a drawing image based on the image data extracted from the electronic mail.

The electronic whiteboard 2 may display an image other than the drawing image drawn by the user ("non-drawing image"), such as an image of a presentation material or an image of a background displayed on a display 220 provided with the electronic whiteboard 2. The electronic whiteboard 2 generates image data in RPCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in RPCS and the image data in PDF each is data relating to an image as a drawing image drawn by a user, or a non-drawing image displayed by a user, for example. The electronic whiteboard 2 is an example of a shared terminal to be shared by a plurality of users. The plurality of users are able to view a same image simultaneously. The IC card 3 and the smartphone 4 are an example of a privately-owned terminal, privately owned by each user. Preferably, the privately-owned terminal is a portable terminal, which is easily carried with the user, such as to the meeting. The MFP 9 is an example of a printer. The PC 10 is an example of an individual terminal operated by an individual user. Examples of the individual terminal include a desktop PC, a laptop PC, and a tablet. In this disclosure, the individual terminal is a terminal that is operated by the user such as a terminal owned by the user. The PC 10 does not have to be brought to the meeting, as long as the user is able to access his or her email address using the PC 10. The image data may be in any suitable format other than RPCS, such as in Printer Control Language (PCL), Page Description Language (PDL), and Post Script (PS).

In FIG. 1, a user A, who owns the IC card 3, brings the IC card 3 to a meeting being held with the electronic whiteboard 2. A user B, who owns the smartphone 4, brings the smartphone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The destination management server 6 manages an email address of the PC 10 owned by each user. In this disclosure, the email address of the PC 10 owned by each user is an email address of each user, and the email address is stored in the destination management server 6 in association with a corresponding user ID. The mail server 7 controls transmission or reception of electronic mails (emails) through the communication network 100. The print server 8 is a server that implements so-called secure printing. The print server 8 stores data reflecting the image data transmitted from the electronic whiteboard 2 or PC 10 (in this example, print data), and, in response to a request from the MFP 9, transmits the data relating to an image to the MFP 9.

<Hardware Configuration>

Referring to FIGS. 2 to 7, a hardware configuration of the apparatus and terminal in the communication system 1 is described according to the embodiment.

<Hardware Configuration of Electronic Whiteboard>

Figure 2:
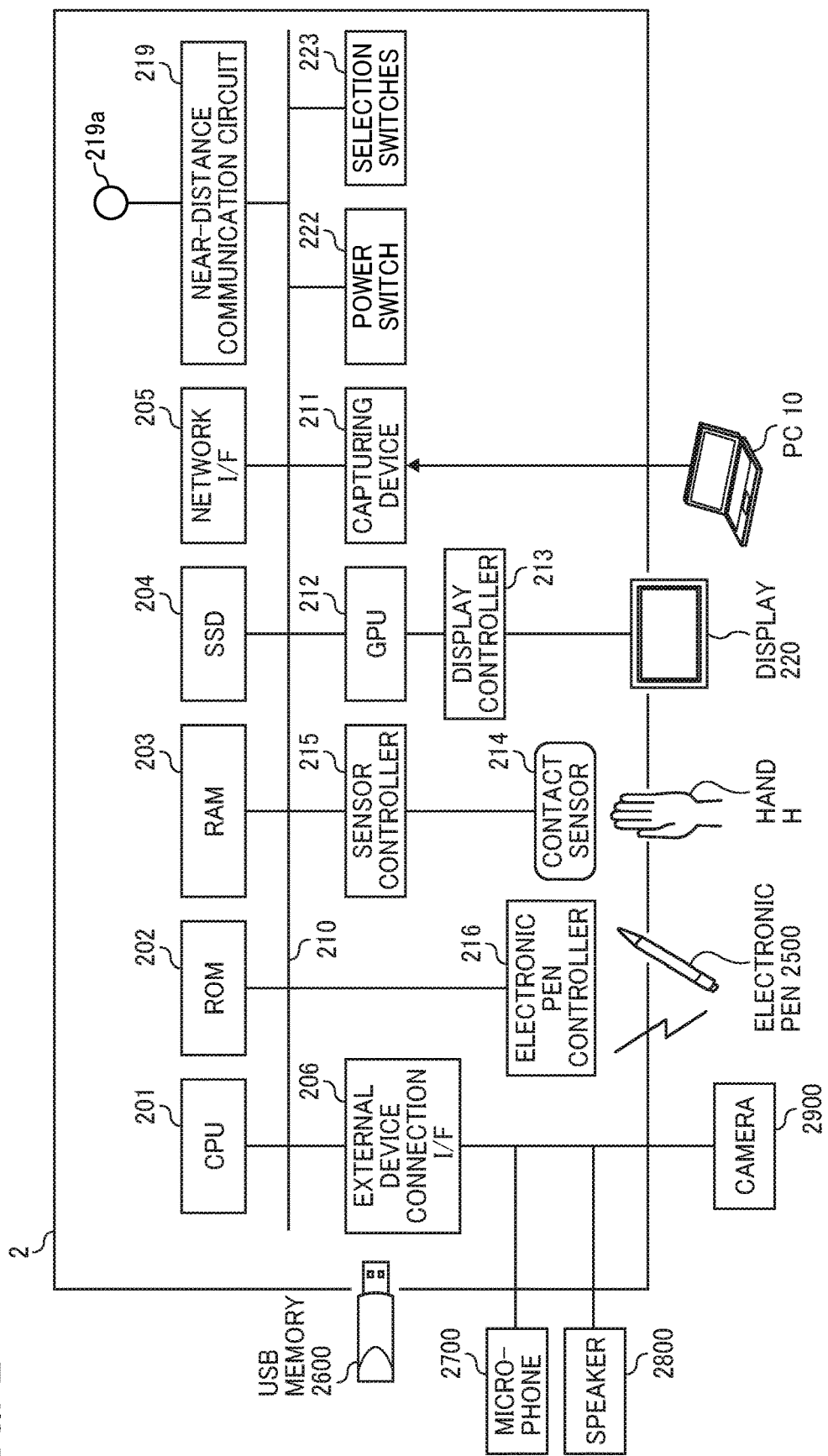
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls the entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a Universal Serial Bus (USB) memory 2600, and external devices such as a camera 2900, a speaker 2800, a microphone 2700, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, and an antenna 219a for the near-distance communication circuit 219, a power switch 222, and selection switches 223.

The capturing device 211 causes a display 508 of the PC 10 to display a still image or a video image based on image data. The capturing device 211 is connected to the PC 10 by a cable. This cable may be a cable for analog Red-Green-Blue (RGB) (video graphics array (VGA)) signal, a cable for component video, or a cable for a high-definition multimedia interface (HDMI) (registered trademark), a digital video interactive (DVI), a universal serial bus (USB), or a display port. The GPU 212 is a semiconductor chip dedicated to processing a graphical image. The display controller 213 controls display of an image processed at the GPU 212 for output through the display 220 provided with the electronic whiteboard 2. The contact sensor 214 detects a touch onto the display 220 with an electronic pen 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The near-distance communication circuit 219 is a communication circuit that communicates in compliance with the NFC, the Bluetooth, and the like. The power switch 222 is a switch for turning on or off the power of the electronic whiteboard 2. The selection switches 223 are a group of switches for adjusting brightness, hue, etc., of display on the display 220, for example.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of IC Card>

Figure 3:
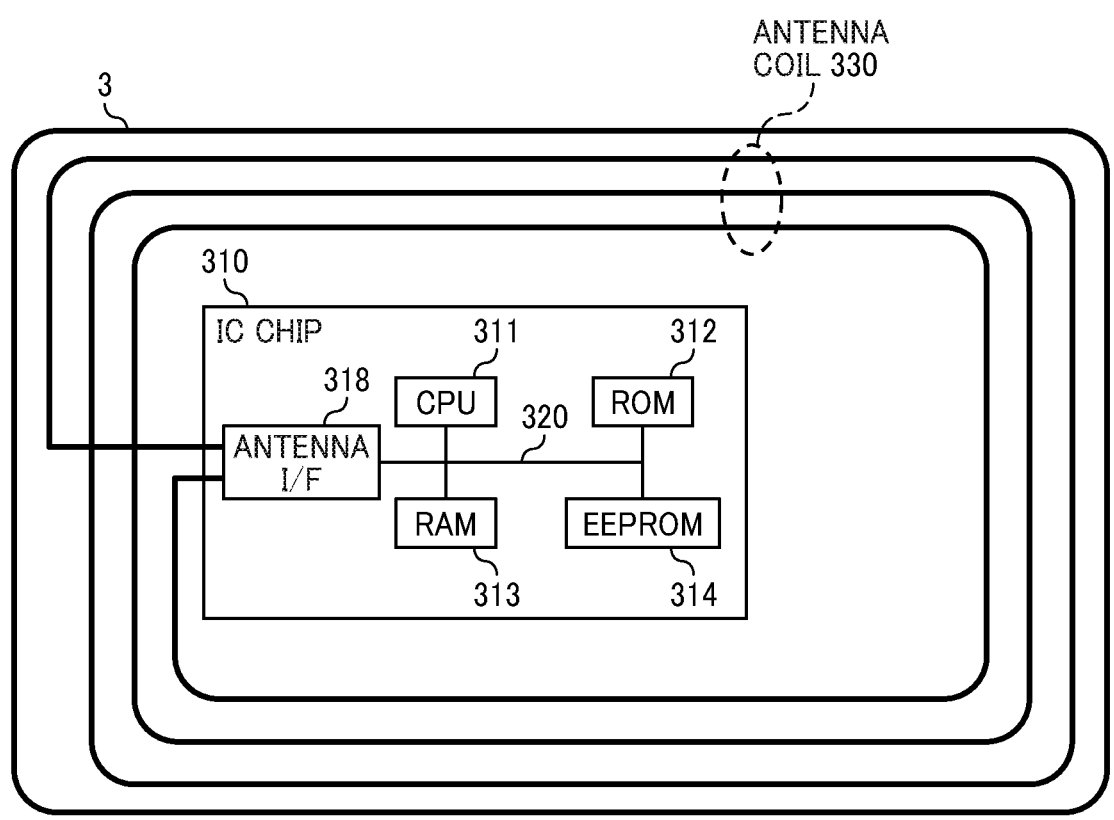
FIG. 3 is a schematic block diagram illustrating a hardware configuration of an integrated circuit (IC) card, according to an embodiment.

FIG. 3 is a diagram illustrating a hardware configuration of the IC card 3 according to the embodiment. In this disclosure, a contactless IC card is used to describe the IC card 3, but a contact IC card may be used instead of the contactless IC card. As illustrated in FIG. 3, the IC card 3 includes an IC chip 310 and an antenna coil 330. The IC chip 310 further includes a CPU 311, a ROM 312, a RAM 313, an Electrically Erasable and Programmable ROM (EEPROM) 314, and an antenna I/F 318.

The CPU 311 controls the entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, such as a reader and writer, to obtain or provide data with the external device.

<Hardware Configuration of Smartphone>

Figure 4:
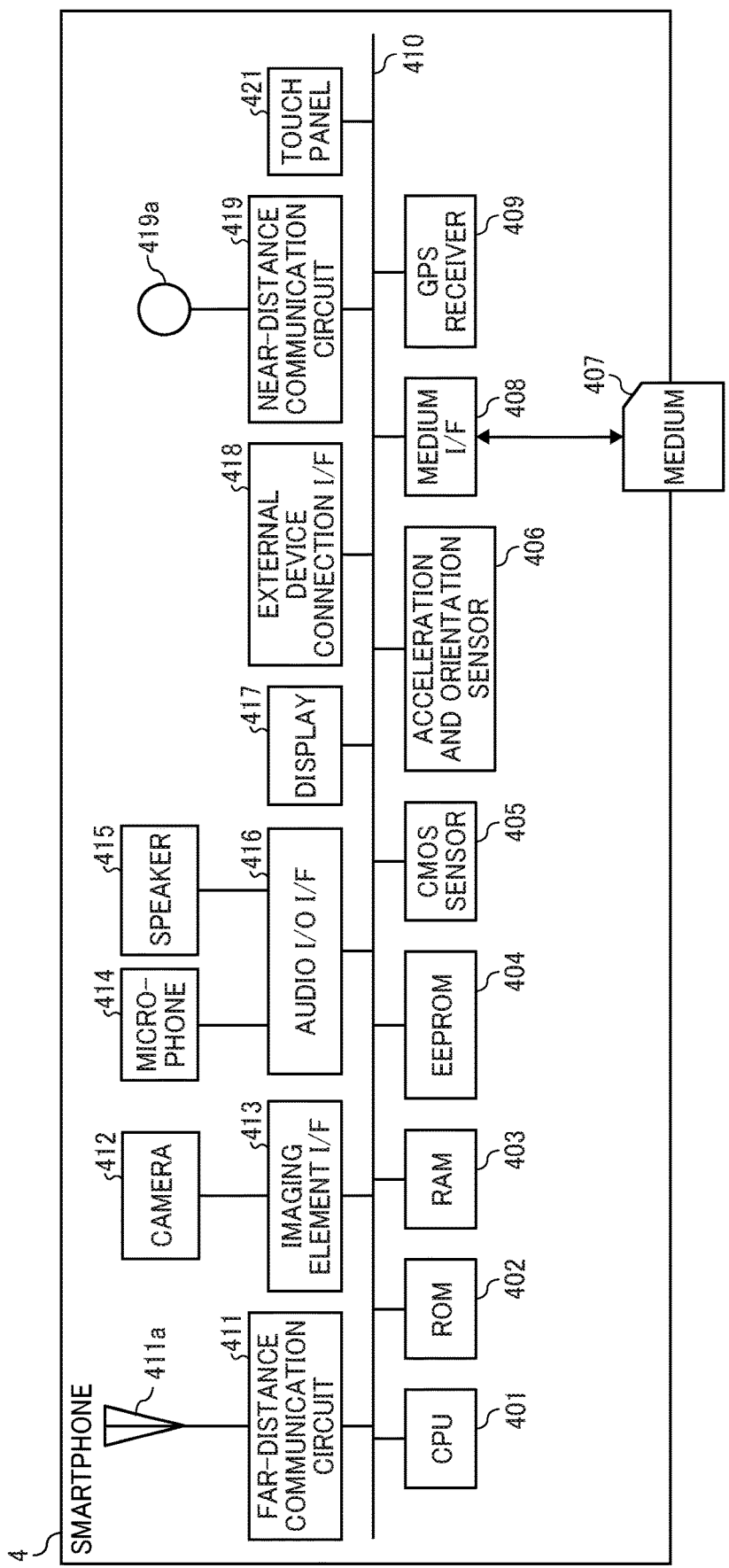
FIG. 4 is a schematic block diagram illustrating a hardware configuration of a smartphone, according to an embodiment.

FIG. 4 is a diagram illustrating a hardware configuration of the smartphone 4 according to the embodiment. As illustrated in FIG. 4, the smartphone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a global positioning system (GPS) receiver 409.

The CPU 401 controls entire operation of the smartphone 4. The ROM 402 stores a control program for controlling the CPU 401 such as an IPL. The RAM 403 is used as a work area for the CPU 401. The EEPROM 404 reads or writes various data such as a control program for the smartphone 4 under control of the CPU 401. The CMOS sensor 405 captures an object (mainly, the user operating the smartphone 4) under control of the CPU 401 to obtain captured image data. The acceleration and orientation sensor 406 includes various sensors such as an electromagnetic compass or gyrocompass for detecting geomagnetism, and an acceleration sensor. The medium I/F 408 controls reading or writing of data with respect to a recording medium 407 such as a flash memory. The GPS receiver 409 receives a GPS signal from a GPS satellite.

The smartphone 4 further includes a far-distance communication circuit 411, a camera 412, an imaging element I/F 413, a microphone 414, a speaker 415, an audio input/output (I/O) I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of imaging device capable of capturing a subject to obtain image data under control of the CPU 401, and is incorporated in the smartphone 4. The imaging element I/F 413 is a circuit that controls driving of the camera 412. The microphone 414 is an example of audio collecting device capable of inputting audio under control of the CPU 401, and is incorporated in the smartphone 4. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The external device I/F 418 is an interface circuit that connects the smartphone 4 to various external devices. The near-distance communication circuit 419 is a communication circuit that communicates in compliance with the NFC, the Bluetooth, and the like. The touch panel 421 is an example of input device that enables the user to input a user instruction to the smartphone 4 through touching a screen of the display 417.

The smartphone 4 further includes a bus line 410. The bus line 410 is an address bus or a data bus, which electrically connects the elements in FIG. 4 such as the CPU 401.

<Hardware Configuration of Server and PC>

Figure 5:
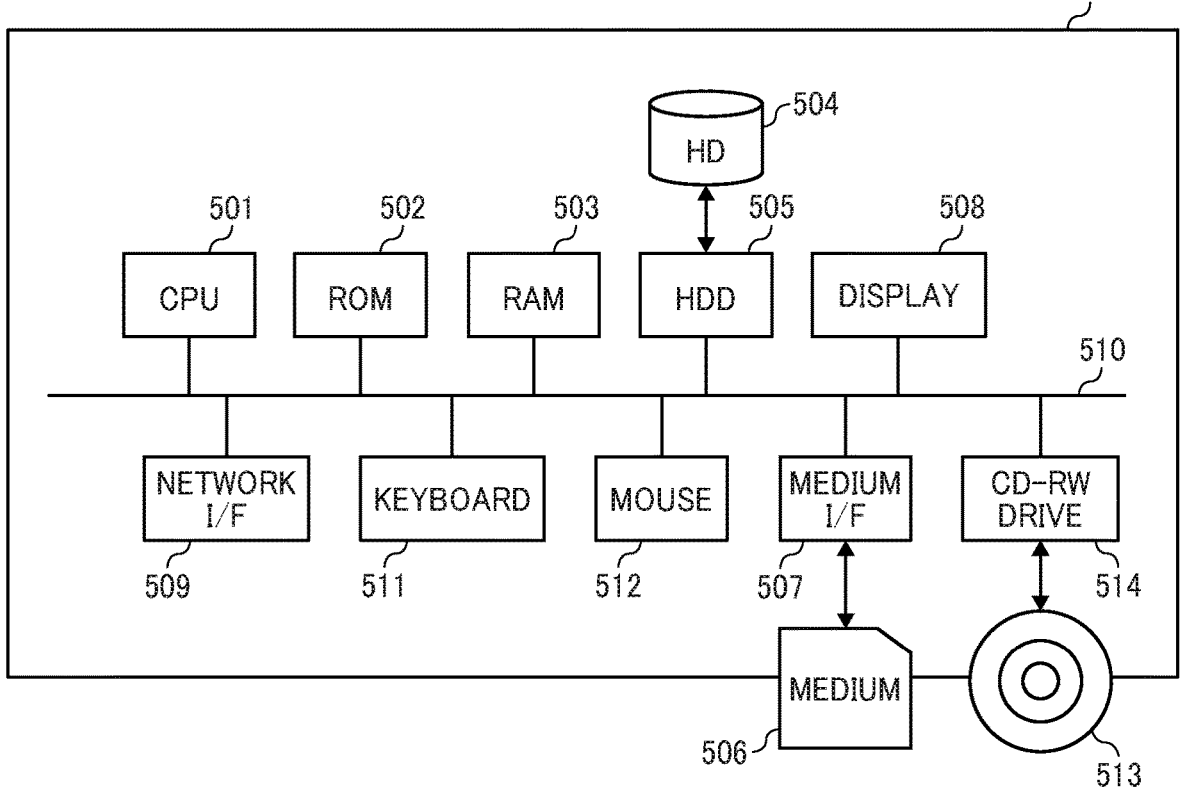
FIG. 5 is a schematic block diagram illustrating a hardware configuration of a sever or a personal computer (PC), according to an embodiment.

FIG. 5 is a diagram illustrating a hardware configuration of each of the server and the PC, according to the embodiment. In this disclosure, since the terminal management server 5, the destination management server 6, the mail server 7, the print server 8, the PC 10a, and the PC 10b have a substantially the same hardware structure, a hardware configuration of the terminal management server 5 is described below as an example. In the following description, even in case of describing the hardware configuration of the destination management server 6, the mail server 7, the print server 8, the PC 10a, or the PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a recording medium 506, a medium I/F 507, a display 508, a network I/F 509, a keyboard 511, a mouse 512, a Compact Disc Rewritable (CD-RW) drive 514, and a bus line 510. Since the terminal management server 5 operates as a server, an input device such as the keyboard 511 and the mouse 512, or an output device such as the display 508 does not have to be provided.

The CPU 501 controls the entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface that controls communication of data with an external device through the communication network 100. The keyboard 511 is one example of an input device provided with a plurality of keys for allowing a user to input characters, numerals, or various instructions. The mouse 512 is one example of the input device for allowing the user to select a specific instruction or execution, select a target for processing, or move a cursor being displayed. The CD-RW drive 514 reads or writes various data with respect to a CD-RW 513, which is one example of a removable recording medium.

The terminal management server 5 further includes a bus line 510. The bus line 510 may be an address bus or a data bus, which electrically connects various elements such as the CPU 501 of FIG. 5.

<Hardware Configuration of MFP>

Figure 6:
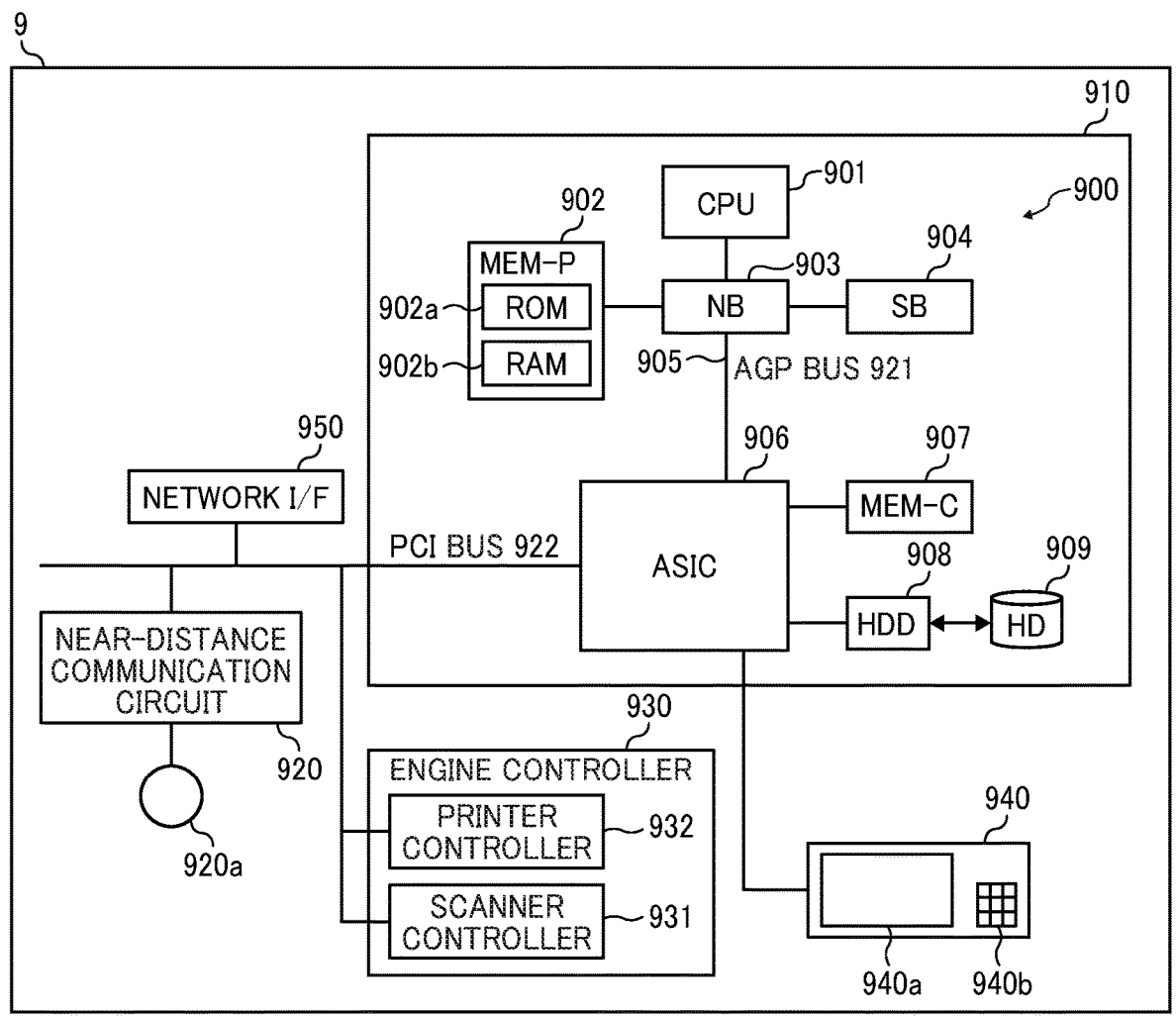
FIG. 6 is a schematic block diagram illustrating a hardware configuration of a multifunctional peripheral product (MFP), according to an embodiment.

FIG. 6 is a diagram illustrating a hardware configuration of the MFP 9, according to the embodiment. As illustrated in FIG. 6, the MFP 9 includes a controller 910, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, a HDD 908, and a HD 909. The NB 903 and the ASIC 906 are connected through an Accelerated Graphics Port (AGP) bus 921.

The CPU 901 controls the entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for achieving various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a CD-ROM, floppy disk (FD), CD-R, or DVD, in a file format installable and executable by the computer, for distribution.

The SB 904 connects the NB 903 with a PCI bus 922 or a peripheral device. The ASIC 906 is an integrated circuit (IC) dedicated to an image processing use, and connects the AGP bus 921, PCI bus 922, HDD 908, and MEM-C 907. The ASIC 906 includes a PCI target, an AGP master, an arbiter (ARB) as a central processor, a memory controller for controlling the MEM-C 907, a plurality of direct memory access controllers (DMACs) capable of converting coordinates of image data with a hardware logic, and a PCI unit that transfers data between the scanner controller 931 and the printer controller 932 through the PCI bus 922. The ASIC 906 may be connected to a Universal Serial Bus (USB) interface, or the Institute of Electrical and Electronics Engineers 1394 (IEEE1394) interface.

The MEM-C 907 is a local memory, which is used as a buffer for image data to be printed or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, processes by the AGP bus 921 can be accelerated.

The near-distance communication circuit 920 is provided with an antenna 920a for the near-distance communication circuit 920. The near-distance communication circuit 920 is a communication circuit that communicates in compliance with the NFC, the Bluetooth, and the like.

The engine controller 930 includes a scanner controller 931 and a printer controller 932. The control panel 940 includes a display 940a and various keys 940b. The control panel 940 displays current settings or a selection screen, and is provided with a touch panel for receiving a user input. The keys 940b, which include such as a ten key and a Start key, are used by the user to enter set values of various image forming parameters such as image density parameter. The controller 910 controls the entire operation of the MFP 9. In an example of the operation, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP 9 selectively performs a document box function, copy function, print function, and facsimile function. When the document box function is selected, the MFP 9 changes its operating mode to a document box mode to store document data. With a selection of the copy function, the MFP 9 operates in a copy mode. With a selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
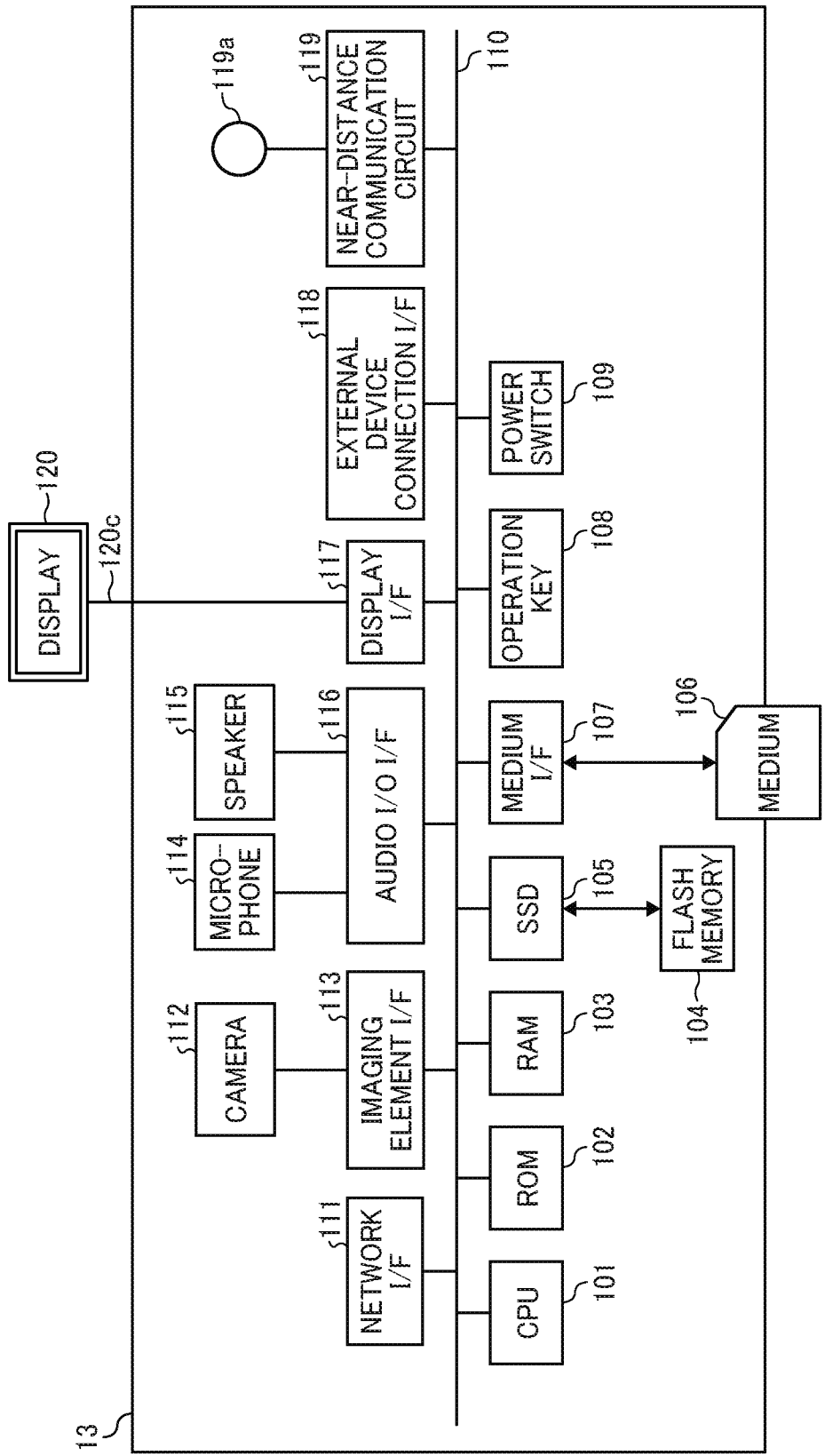
FIG. 7 is a schematic block diagram illustrating a hardware configuration of a videoconference terminal, according to an embodiment.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, a SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls the entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a recording medium 106 such as a flash memory. The operation key (keys) 108 is operated by a user to input a user instruction such as a user selection of a communication destination of the videoconference terminal 13. The power switch 109 is a switch that receives an instruction to turn on or off the power of the videoconference terminal 13.

The network I/F 111 allows communication of data with an external device through the communication network 100 such as the Internet. The camera 112 is an example of built-in imaging device capable of capturing a subject to obtain image data under control of the CPU 101. The imaging element I/F 113 is a circuit that controls driving of the camera 112. The microphone 114 is an example of built-in audio collecting device capable of inputting audio under control of the CPU 101. The audio I/O I/F 116 is a circuit for inputting or outputting an audio signal between the microphone 114 and the speaker 115 under control of the CPU 101. The display I/F 117 is a circuit for transmitting image data to an external display 120 under control of the CPU 101. The external device connection OF 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a displaying unit, such as a liquid crystal or organic electroluminescence (EL) display that displays an image of a subject, an operation icon, or the like. The display 120 is connected to the display I/F 117 by a cable 120c. The cable 120c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the videoconference terminal 13. The recording medium 106 can be any non-volatile memory that reads or writes data under control of the CPU 101, such that any memory such as an EEPROM may be used instead of the flash memory 104.

<Example Screens of Electronic Whiteboard>

Figure 8A:
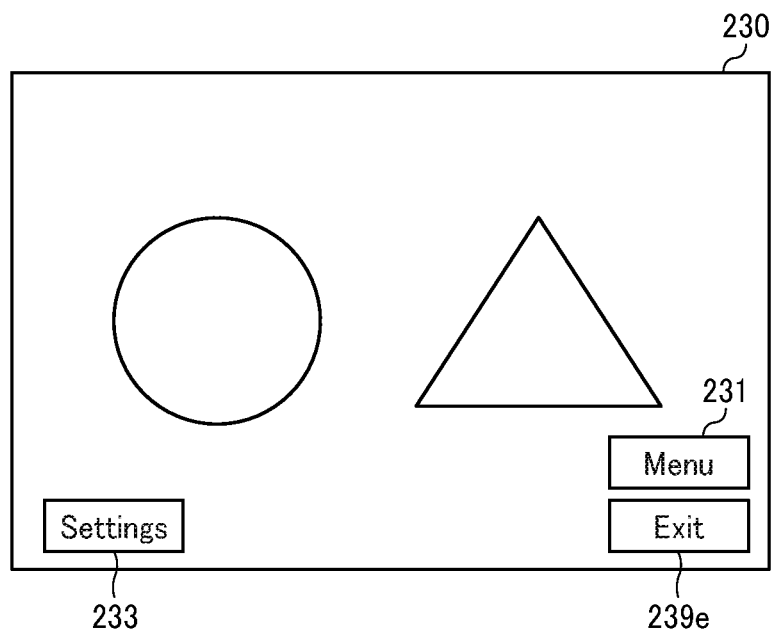
FIGS. 8A, 8B, and 8C are illustrations each of which illustrates an example screen displayed with a display of the electronic whiteboard.

Referring to FIGS. 8A-8C, FIGS. 9A-9D, and FIGS. 10A-10D, example screens of the electronic whiteboard 2 are described according to the embodiment. FIGS. 8A-8C, FIGS. 9A-9D, and FIGS. 10A-10D each illustrates a screen displayed by the electronic whiteboard 2. The electronic whiteboard 2 displays, on the display 220, a drawing image screen 230 as illustrated in FIG. 8A, for example. The drawing image screen 230 displays a drawing image (such as a circle and a triangle in figure) drawn by the user with such as the electronic pen 2500. The drawing image screen 230 displays a "Menu" button 231 and an "Exit" button 239e at the lower right. The drawing image screen 230 displays a "Settings" button 233 at the lower left.

The "Menu" button 231 is a graphical image, which, when selected by the user, causes the electronic whiteboard 2 to perform various types of functions of the electronic whiteboard 2. The "Settings" button 233 is a graphical image, which, when selected, causes the electronic whiteboard 2 to display a security configuration screen 300, which is described later. In alternative to the display 220 of the electronic whiteboard 2, the security configuration screen 300 may be displayed on a display of the PC 10. In this case, a user accesses the electronic whiteboard 2 from a web browser installed on the PC 10a or 10b connected to the communication network 100 to display the security configuration screen 300 on the browser. This enables the user to configure settings from the PC 10a or 10b.

The "Exit" button 239e is a graphical image, which, when selected, enables the user to log out from the electronic whiteboard 2 and causes the electronic whiteboard 2 to finish displaying a screen. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

Figure 8B:
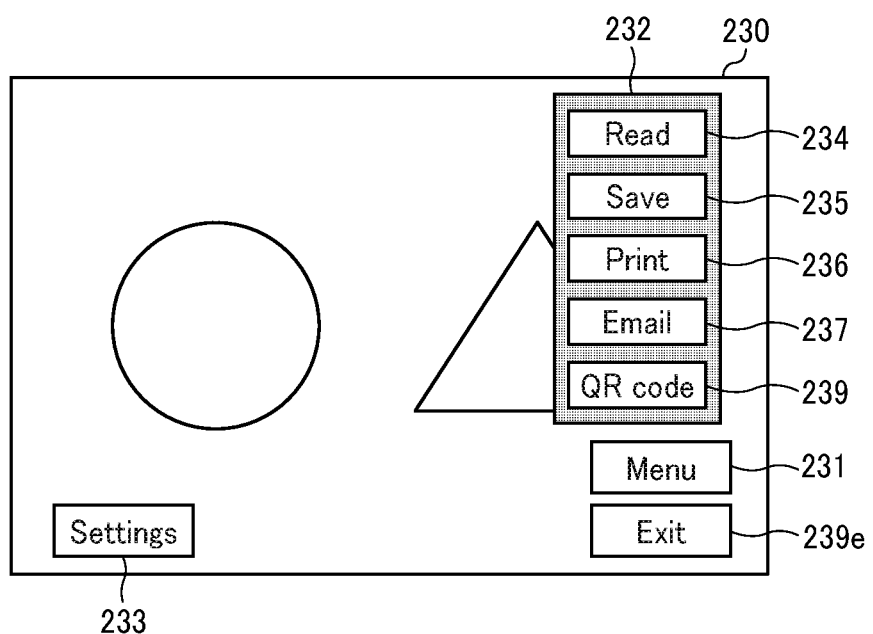

As illustrated in FIG. 8B, the menu selection window 232 includes a "Read" button 234, a "Save" button 235, a "Print" button 236, an "Email" button 237, and a "Quick Response (QR) code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit, to the PC 10a or the PC 10b, etc., the drawing image displayed on the drawing image screen 230, as the drawing image data attached to the email. The "QR code" button 239 is a graphical image, which, when selected, causes the electronic whiteboard 2 to display, on the display 220, a QR code (registered trademark) embedded with a device ID identifying the own device (that is, the electronic whiteboard 2).

Next, example screens to be displayed by the electronic whiteboard 2 when the buttons 234 to 237 and 239e are respectively selected, are described.

Figure 9B:
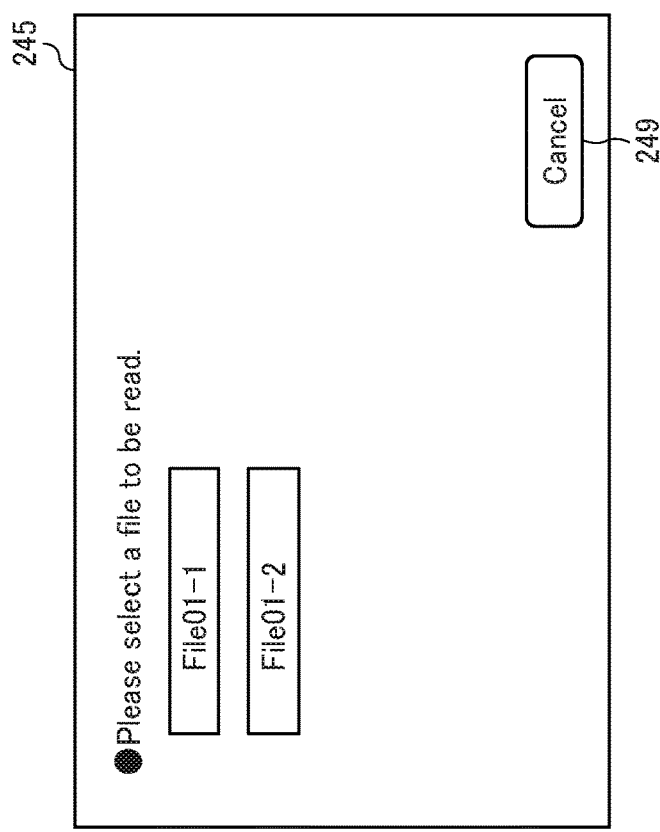
FIGS. 9A, 9B, 9C, and 9D are illustrations each of which illustrates an example screen displayed with the display of the electronic whiteboard.
Figure 9A:
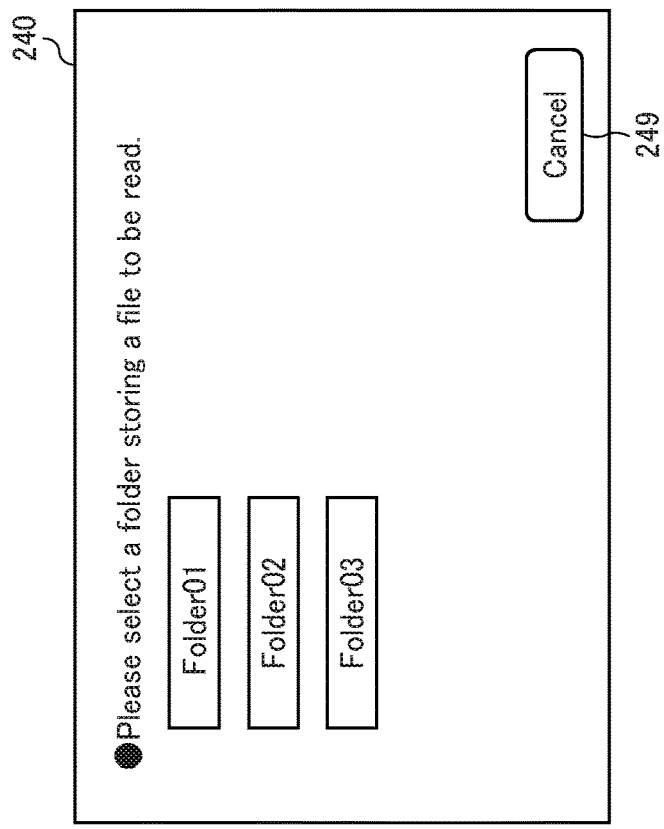

In response to pressing of the "Read" button 234 by the user, the electronic whiteboard 2 controls the display 220 to display a folder selection screen 240 as illustrated in FIG. 9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image of the selected file, as illustrated in FIG. 8A.

Figure 9D:
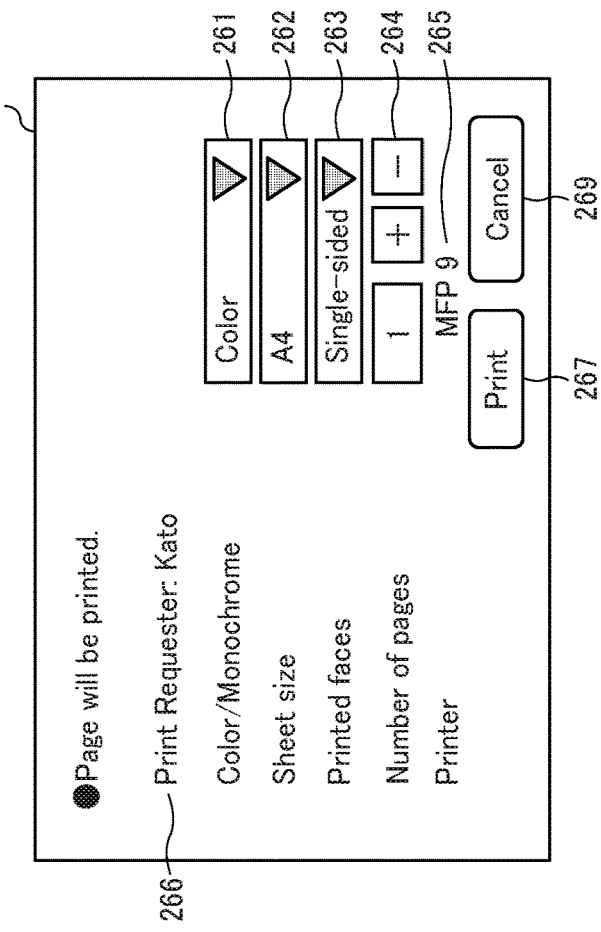
Figure 9C:
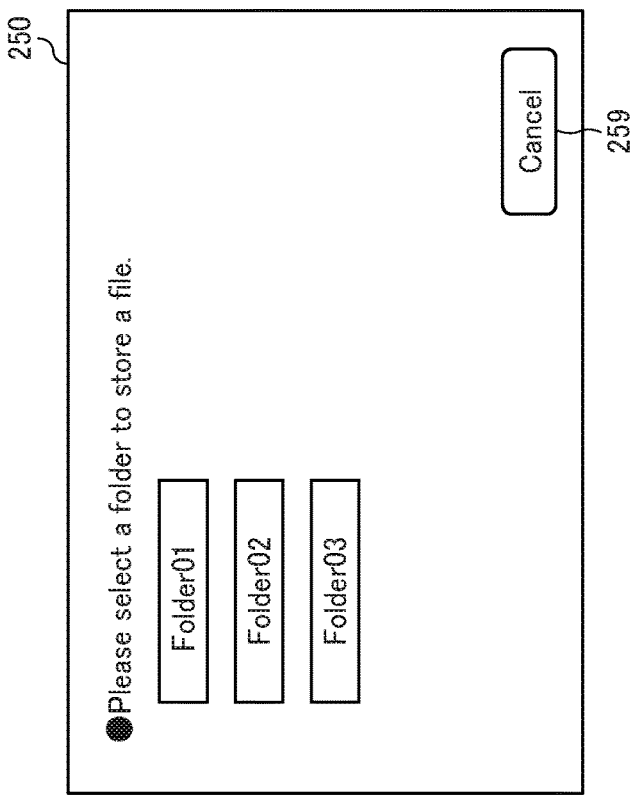

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

In response to pressing of the "Print" button 236 by the user, the electronic whiteboard 2 controls the display 220 to display a print configuration screen 260 as illustrated in FIG. 9D. The print configuration screen 260 displays a print requester field 266, and various types of print parameters. In this disclosure, a name of the user who has logged in is displayed as a print requester name in the print requester field 266. The various types of print parameters are indicated by menus 261 to 264, respectively, for selecting color or monochrome printing, selecting a sheet size (A4, A3, etc.), selecting faces to be printed (single-sided or duplex), and selecting the increase or decrease of a number of pages to be printed. The print configuration screen 260 further displays, in a field 265, a device name identifying a printer (in this example, "MFP 9"). The print configuration screen 260 further displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figure 10B:
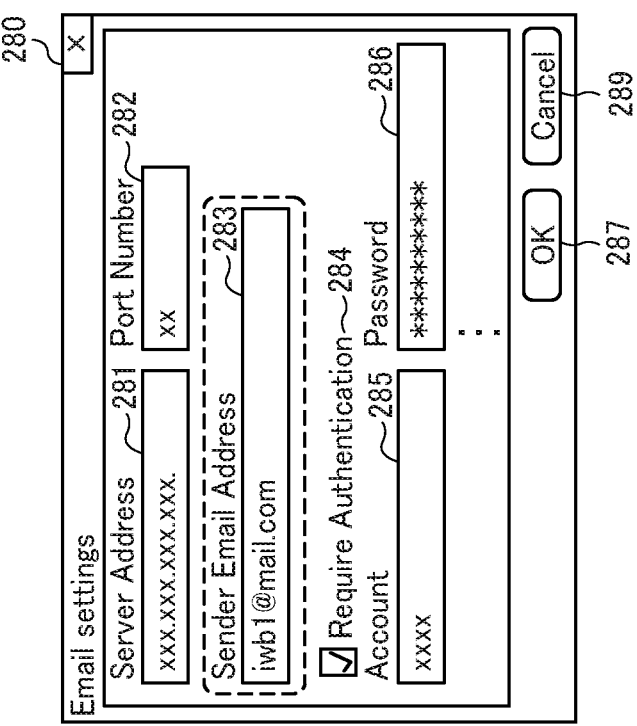
FIGS. 10A, 10B, 10C, and 10D are illustrations each of which illustrates an example screen displayed with the display of the electronic whiteboard.
Figure 10A:
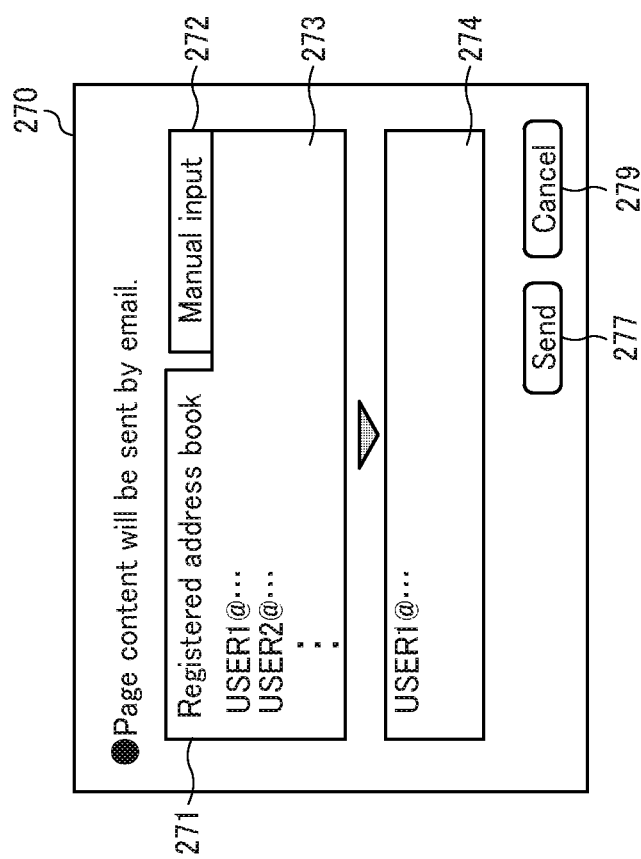

In response to pressing of the "Email" button 237 by the user A, a display control 24 of the electronic whiteboard 2 causes the display 220 to display a destination configuration screen 270 illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. The destination configuration screen 270 further displays, below the registered address book field 273, an address configuration field 274 that lists one or more email addresses, each representing a destination to which an email is actually sent. At the time when the destination configuration screen 270 is displayed, an email address of the user who has logged in is displayed in the address configuration field 274. In this example, an email address of the user A (e.g., "USER1@ . . . ") is displayed, which is transmitted at S19 as described later, when the user A logs in the electronic whiteboard 2. The destination configuration screen 270 further displays a "Send" button 277 to be selected by the user to start transmission of email.

In another example, the electronic whiteboard 2 may display, on the display 220, an email configuration screen 280 as illustrated in FIG. 10B, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email address field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 284 is a field to be set with information indicating whether or not to request the mail server 7 to authenticate the email sender. The account field 285 and the password field 286 are entered with account information, which is to be used by the mail server 7 to authenticate the electronic whiteboard 2 using Send Mail Transfer Protocol (SMTP).

Figure 10D:
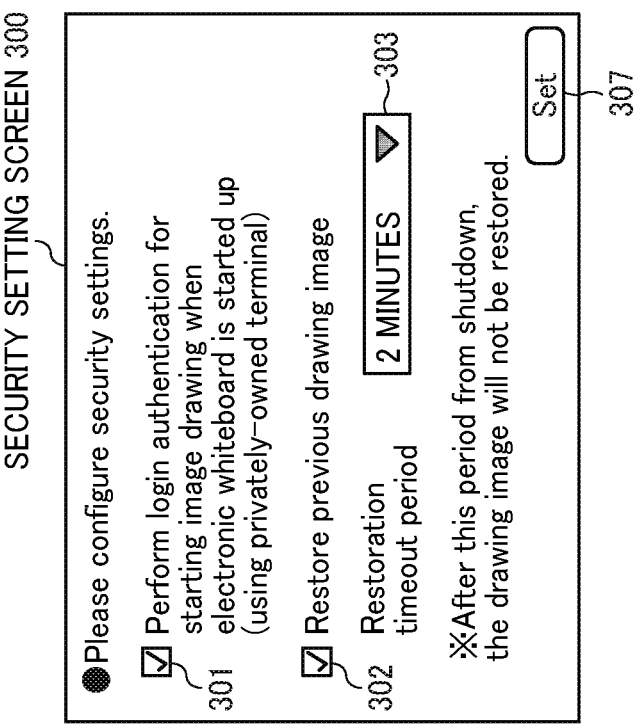
Figure 10C:
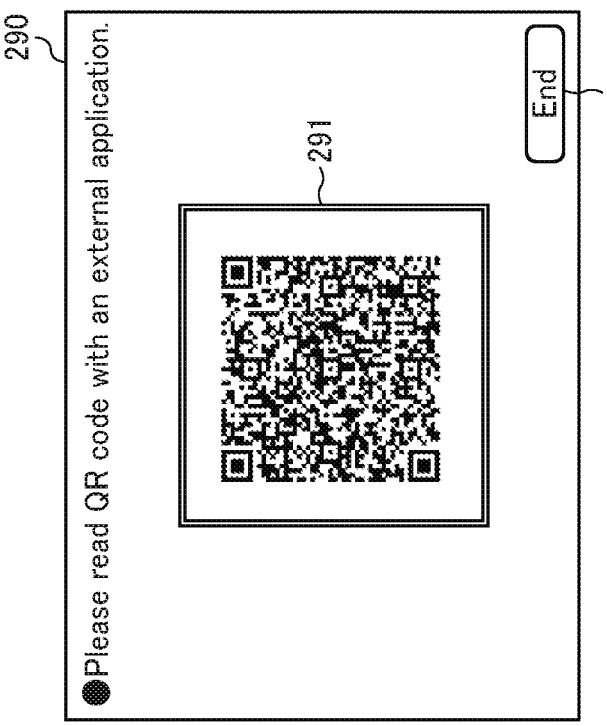

In response to pressing of the "QR code" button 239 by the user, the electronic whiteboard 2 controls the display 220 to display a QR code display screen 290 as illustrated in FIG. 10C. The QR code display screen 290 displays a QR code 291 embedded with the device ID for identifying the electronic whiteboard 2 (the own device). For example, the user activates a QR code reader application installed on such as the smartphone, to cause the activated reader application to read the QR code 291 to obtain the device ID of the electronic whiteboard 2. The QR code display screen 290 further includes an "Exit" button 297, which switches back from the QR code display screen 290 to the drawing image screen 230. For each of the screens illustrated in FIGS. 10A and 10B, "Cancel" buttons 279 and 289 are displayed to return to the drawing image screen 230 illustrated in FIG. 8A.

The electronic whiteboard 2 further displays, on the display 220, the security configuration screen 300 as illustrated in FIG. 10D, as a screen that is displayed in accordance with the user's instruction. The security configuration screen 300 includes check boxes 301 and 302, and a pull-down menu 303. The check box 301 accepts an instruction to select whether to perform login authentication when the electronic whiteboard 2 is started up. The check box 302 accepts an instruction to select whether to restore (recover) the previous drawing image and display (redisplay) when the electronic whiteboard 2 is started up. The pull-down menu 303 accepts an instruction for setting a restoration time-out period. The restoration time-out period is an elapsed time from the last time when the electronic whiteboard 2 was shut down by the turn-off of the power, during which the drawing image is to be restored. The user puts or removes a mark to or from the check box 301 or the check box 302, and selects desired time in the pull-down menu 303 with such as the electronic pen 2500. Further, in response to pressing of a "Settings" button 307 by the user, a setting unit 27 (described later) configures settings that reflect the marked item and the selected time.

Figure 8C:
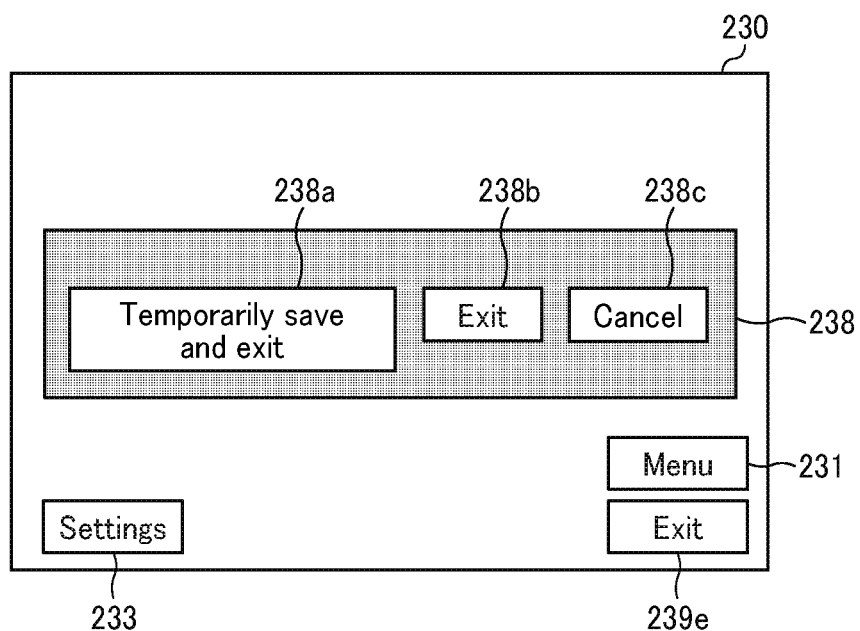

Referring again to FIG. 8A, when the user presses the "Exit" button 239*e* with such as the electronic pen 2500, as illustrated in FIG. 8C, the electronic whiteboard 2 displays, on the drawing image screen 230, an exit window 238 for logging out and finishing the display.

As illustrated in FIG. 8C, the exit window 238 includes a "Temporarily save and exit" button 238*a*, an "Exit" button 238*b*, and a "Cancel" button 238*c*.

The "Temporarily save and exit" button 238*a* is a graphical image, which, when selected, causes the electronic whiteboard 2 to temporarily store the drawing image data, allows the user to log out from the electronic whiteboard 2, and causes the electronic whiteboard 2 to finish displaying. The "Exit" button 238*b* is a graphical image, which, when selected, allows the user to log out from the electronic whiteboard 2, and causes the electronic whiteboard 2 to finish displaying, without temporarily storing the drawing image data. Accordingly, an image representing the drawing image data is not displayed (redisplayed) the next time a user logs in. The "Cancel" button 238*c* is a graphical image, which, when selected, causes the electronic whiteboard 2 to finish displaying the exit window 238 and return to the drawing image screen 230 illustrated in FIG. 8A.

Any one of the IDs described above is an example of identification information identifying a corresponding device or terminal, or user, who operates the device or terminal. The device ID is an example of device identification information. The terminal ID is an example of terminal identification information. The user ID is an example of user identification information. Further, the device identification information and the terminal identification information include a manufacturing number. Furthermore, the user identification information includes an employee number, a driver license number, and an individual number called "My Number" under the Japan's Social Security and Tax Number System.

Further, any one of the above-described control programs may be recorded in a file in a format installable or executable on a computer-readable recording medium for distribution. Examples of the recording medium include, but not limited to, a compact disc-recordable (CD-R), digital versatile disc (DVD), Blu-ray disc, and Secure Digital (SD) card. In addition, such recording medium may be provided in the form of a program product to users within a certain country or outside that country.

The servers 5, 6, 7, and 8 may be configured by a single computer or a plurality of computers to which divided portions (functions, means, or storages) are arbitrarily allocated.

<Functional Configuration of Communication System>

Figure 11B:
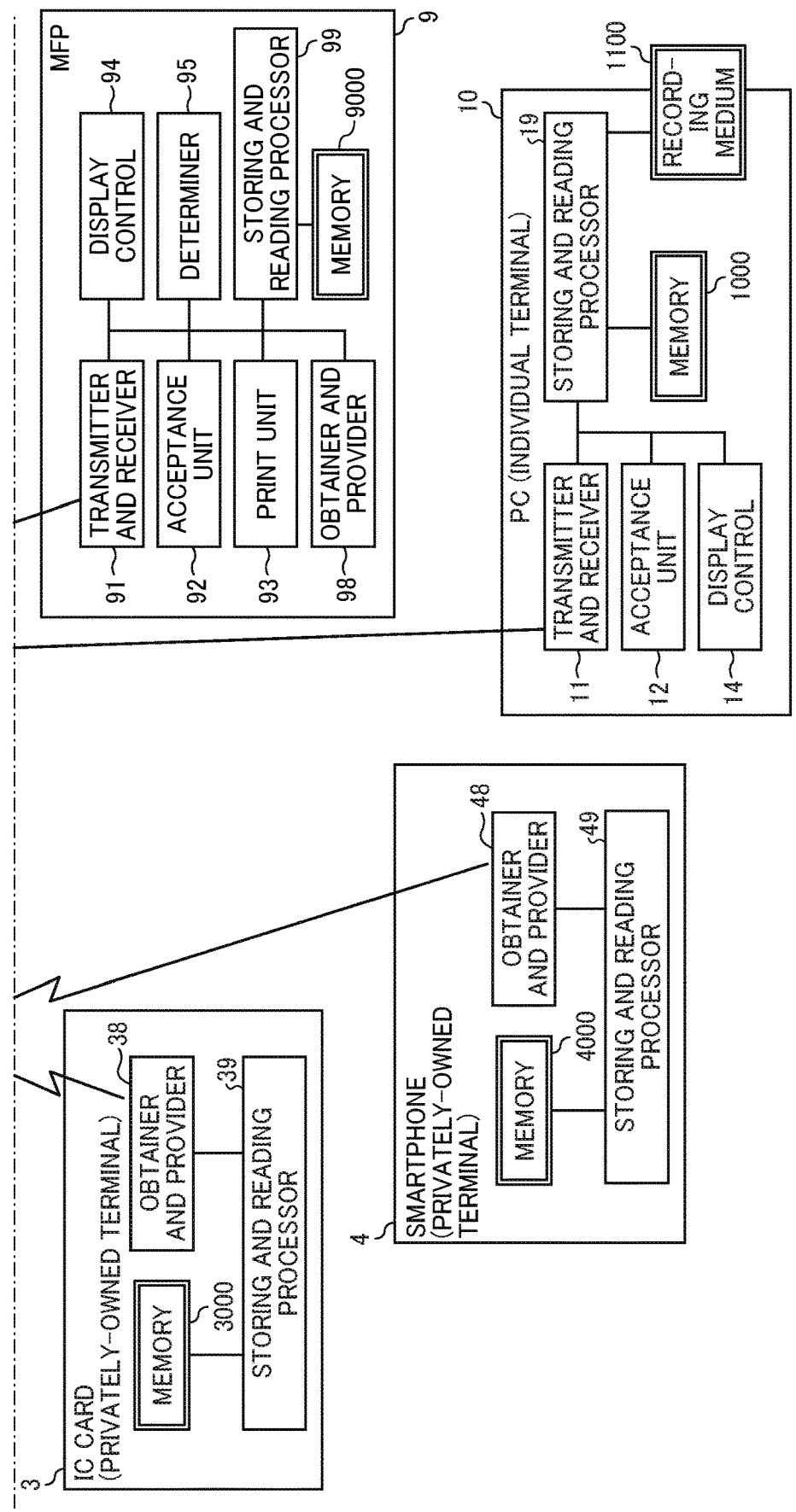

Referring to FIGS. 11A and 11B and FIGS. 12A-12B, a functional configuration of the communication system 1 is described according to the embodiment. FIGS. 11A and 11B are a diagram illustrating a functional configuration of the communication system 1. In FIGS. 11A and 11B, only a part of those terminals, devices, and servers illustrated in FIG. 1 is illustrated, which relates to processing or operation described below.

<Functional Configuration of Electronic Whiteboard>

As illustrated in FIG. 11A, the electronic whiteboard 2 includes a transmitter and receiver 21, an acceptance unit 22, an image and audio processor 23, the display control 24, a determiner 25, a first generator 26*a*, a second generator 26*b*, a setting unit 27, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each functional unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 100.

The acceptance unit 22, which is implemented by the instructions of the CPU 201, the contact sensor 214, and the electronic pen controller 216, illustrated in FIG. 2, accepts various inputs from the user.

The image and audio processor 23 is implemented by the instructions of the CPU 201, illustrated in FIG. 2. The image and audio processor 23 applies image processing to image data that is obtained by capturing a subject by the camera 2900. After the audio of the user is converted to an audio signal by the microphone 2700, the image and audio processor 23 applies processing to audio data based on this audio signal. The image and audio processor 23 outputs the audio signal according to the audio data to the speaker 2800, and the speaker 2800 outputs audio. The image and audio processor 23 obtains drawing image data, drawn by the user with the electronic pen 2500 or the user's hand H onto the display 220, and converts the drawing image data to coordinate data. For example, when the electronic whiteboard 2*x* transmits the coordinate data to the electronic whiteboard 2*y* at another site, the electronic whiteboard 2y causes the display 220 to display a drawing image having the same content based on the received coordinate data.

The display control 24, which is implemented by the instructions of the CPU 201 illustrated in FIG. 2 and by the display controller 213 illustrated in FIG. 2, causes the display 220 to display a drawing image.

The determiner 25, which is implemented by the instructions of the CPU 201 illustrated in FIG. 2, determines whether the electronic whiteboard 2 has received any terminal ID, for example, from the IC card 3 or the smartphone 4.

The first generator 26a, which is implemented by the instructions of the CPU 201 illustrated in FIG. 2, generates image data in PDF, from the drawing image data in a bitmap that has been generated based on drawing by the user. The second generator 26b, which is implemented by the instructions of the CPU 201 illustrated in FIG. 2, generates image data in RPCS, from the drawing image data in the bitmap that has been generated based on drawing by the user. The image data may be in any suitable format other than RPCS, such as in PDL or PS.

The setting unit 27, which is implemented by the instructions of the CPU 201 illustrated in FIG. 2, configures settings such as an email sender, an email destination, or a print requester name of a user who requests printing in accordance with print data. The setting unit 27 further configures settings regarding login authentication and redisplay of a drawing image (restoration of an image).

The obtainer and provider 28, which is implemented by the instructions of the CPU 201 and the near-distance communication circuit 219 with the antenna 219a, illustrated in FIG. 2, communicates with the IC card 3 or the smartphone 4 to obtain or provide data from or to the IC card 3 or the smartphone 4 by near-distance communication.

The storing and reading processor 29, which is implemented by the instructions of the CPU 201 and the SSD 204 illustrated in FIG. 2, performs processing to store various types of data in the memory 2000 or the recording medium 2100 or to read various types of data stored in the memory 2000 or the recording medium 2100. Further, every time image data and audio data are received in performing communication with other electronic whiteboard or videoconference terminal, the memory 2000 overwrites the image data and audio data. The display 220 displays an image based on image data before being overwritten, and the speaker 2800 outputs audio based on audio data before being overwritten. The recording medium 2100 is implemented by the USB memory 2600 illustrated in FIG. 2.

<Functional Configuration of IC Card>

As illustrated in FIG. 11B, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each functional unit of IC card)

Each functional unit of the IC card 3 is described according to the embodiment. The obtainer and provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card 3 as one example of a privately-owned terminal.

<Functional Configuration of Smartphone>

As illustrated in FIG. 11B, the smartphone 4 includes an obtainer and provider 48 and a storing and reading processor 49. These units are functions that are implemented by or that are caused to function by operating any of the elements illustrated in FIG. 4 in cooperation with the instructions of the CPU 401 according to the smartphone control program expanded from the EEPROM 404 to the RAM 403. The smartphone 4 further includes a memory 4000, which is implemented by the RAM 403 and the EEPROM 404 illustrated in FIG. 4.

(Each functional unit of smartphone)

Each functional unit of the smartphone 4 is described according to the embodiment. The obtainer and provider 48, which is implemented by the instructions of the CPU401 and the near-distance communication circuit 419 with the antenna 419a, illustrated in FIG. 4, communicates with the electronic whiteboard 2 to obtain or provide data from or to the electronic whiteboard 2 by near-distance communication.

The storing and reading processor 49, which is implemented by the instructions of the CPU 401 illustrated in FIG. 4, performs processing to store various types of data in the memory 4000 or read various types of data stored in the memory 4000. The memory 4000 stores a terminal ID for identifying the smartphone 4 as one example of a privately-owned terminal.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000 implemented by the HD 504 illustrated in FIG. 5.

(Terminal Management Table)

FIG. 12A is a conceptual diagram illustrating a terminal management table according to the embodiment. The memory 5000 stores a terminal management (database) DB 5001, which is implemented by the terminal management table illustrated in FIG. 12A. The terminal management table illustrated in FIG. 12A stores, for each one of a plurality of privately-owned terminals (IC card 3, smartphone 4) registered to the terminal management server 5, a user ID identifying a user who owns the privately-owned terminal and a user name in association with the terminal ID identifying the privately-owned terminal.

(Each Functional Unit of Terminal Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 11A will also be described.

The transmitter and receiver 51 of the terminal management server 5 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smartphone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of Destination Management Server>

The destination management server 6 includes a transmitter and receiver 61, and a storing and reading processor 69. These units are functions that are implemented by or that are caused to function by operating any of the elements illustrated in FIG. 5 in cooperation with the instructions of the CPU 501 according to the destination management program expanded from the HD 504 to the RAM 503. The destination management server 6 includes a memory 6000 implemented by the HD 504 illustrated in FIG. 5.

(Destination Management Table)

FIG. 12B is a conceptual diagram illustrating a destination management table according to an embodiment. The memory 6000 stores a destination management DB 6001 implemented by the destination management table illustrated in FIG. 12B. The destination management table stores, for each of one or more registered users being managed by the destination management server 6, a user ID identifying the user and an email address of the PC 10 of the user, in association with each other.

(Each functional Unit of Destination Management Server)

Next, each functional unit of the destination management server 6 is described in detail according to the embodiment. In the following description of the functional configuration of the destination management server 6, relationships of the hardware elements in FIG. 5 with each functional unit of the destination management server 6 in FIG. 11A will also be described.

The transmitter and receiver 61 of the destination management server 6 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 69, which is implemented by the instructions of the CPU 501 illustrated in FIG. 5 and the HDD 505 illustrated in FIG. 5, performs processing to store various types of data in the memory 6000 or read various types of data stored in the memory 6000.

<Functional Configuration of Mail Server>

The mail server 7 includes a transmitter and receiver 71, and a storing and reading processor 79. These units are functions that are implemented by or that are caused to function by operating any of the elements illustrated in FIG. 5 in cooperation with the instructions of the CPU 501 according to the destination management program expanded from the HD 504 to the RAM 503. The mail server 7 includes a memory 7000 implemented by the HD 504 illustrated in FIG. 5.

(Each Functional Unit of Mail Server)

Next, each functional unit of the mail server 7 is described in detail according to the embodiment. In the following description of the functional configuration of the mail server 7, relationships of the hardware elements in FIG. 5 with each functional unit of the mail server 7 in FIG. 11A will also be described.

The transmitter and receiver 71 of the mail server 7 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 79, which is implemented by the instructions of the CPU 501 illustrated in FIG. 5 and the HDD 505 illustrated in FIG. 5, performs processing to store various types of data in the memory 7000 or read various types of data stored in the memory 7000.

<Functional Configuration of Print Server>

The print server 8 includes a transmitter and receiver 81, and a storing and reading processor 89. These units are functions that are implemented by or that are caused to function by operating any of the elements illustrated in FIG. 5 in cooperation with the instructions of the CPU 501 according to the print management program expanded from the HD 504 to the RAM 503. The print server 8 includes a memory 8000 implemented by the HD 504 illustrated in FIG. 5. The memory 8000 stores data relating to an image (in this example, print data) transmitted from the electronic whiteboard 2, etc.

(Print Data Management Table)

FIG. 12C is a conceptual diagram illustrating a print data management table according to the embodiment. The memory 8000 stores a print data management DB 8001 implemented by the print data management table illustrated in FIG. 12C. The print data management table illustrated in FIG. 12C stores a user name for identifying a user who owns the privately-owned terminal, a file name of data to be printed such as the data relating to an image (in this example, print data), and print setting parameters, in association with one another.

(Each Functional Unit of Print Server)

Next, each functional unit of the print server 8 is described in detail according to the embodiment. In the following description of the functional configuration of the print server 8, relationships of the hardware elements in FIG. 5 with each functional unit of the print server 8 in FIG. 11A will also be described.

The transmitter and receiver 81 of the print server 8 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 89, which is implemented by the instructions of the CPU 501 illustrated in FIG. 5 and the HDD 505 illustrated in FIG. 5, performs processing to store various types of data in the memory 8000 or read various types of data stored in the memory 8000.

<Functional Configuration of MFP>

As illustrated in FIG. 11B, the MFP 9 includes a transmitter and receiver 91, an acceptance unit 92, a print unit 93, a display control 94, a determiner 95, an obtainer and provider 98, and a storing and reading processor 99. These units are functions that are implemented by or that are caused to function by operating any of the elements illustrated in FIG. 6 in cooperation with the instructions of the CPU 901 according to the print control program expanded to the RAM 902b. The MFP 9 further includes a memory 9000 implemented by the HD 909 illustrated in FIG. 6.

(Functional Configuration of MFP)

Next, each functional unit of the MFP 9 is described in detail according to the embodiment. In the following description of the functional configuration of the MFP 9, relationships of one or more hardware elements in FIG. 6 with each functional unit of the MFP 9 in FIG. 11B will also be described.

The transmitter and receiver 91 of the MFP 9 illustrated in FIG. 11B, which is implemented by the instructions of the CPU 901 illustrated in FIG. 6 and by the network I/F 950 illustrated in FIG. 6, transmits or receives various types of data (or information) to or from another terminal, device, or system via the communication network 100.

The acceptance unit 92, which is implemented by the instructions of the CPU 901 and the control panel 940 illustrated in FIG. 6, accepts various inputs from the user.

The print unit 93, which is implemented by the instructions of the CPU 901 illustrated in FIG. 6 and the printer controller 932, prints an image based on the data relating to an image (print data).

The display control 94, which is implemented by the instructions of the CPU 901 and the control panel 940 illustrated in FIG. 6, displays print setting parameters to be set when performing a copying process, such as color printing or monochrome printing, for example.

The determiner 95, which is implemented by the instructions of the CPU 901 illustrated in FIG. 6, determines, for example, whether an authentication result transmitted from the terminal management server 5 indicates that the IC card 3 (terminal ID) is a legitimate IC card.

The obtainer and provider 98, which is implemented by the instructions of the CPU 901 and the near-distance communication circuit 920 with the antenna 920a, illustrated in FIG. 6, communicates with the IC card 3 or the smartphone 4 to obtain or provide data from or to the IC card 3 or the smartphone 4 by near-distance communication.

The storing and reading processor 99, which is implemented by the instructions of the CPU 901 illustrated in FIG. 6 and the HDD 908 illustrated in FIG. 6, performs processing to store various types of data in the memory 9000 or read various types of data stored in the memory 9000.

<Functional Configuration of PC>

As illustrated in FIG. 11B, the PC 10 includes a transmitter and receiver 11, an acceptance unit 12, a display control 14, and a storing and reading processor 19. These units are functions that are implemented by or that are caused to function by operating any of the elements illustrated in FIG. 5 in cooperation with the instructions of the CPU 501 according to the terminal control program expanded from the HD 504 to the RAM 503. The PC 10 further includes a memory 1000 implemented by the HD 504 illustrated in FIG. 5.

(Each functional unit of PC)

Next, a functional configuration of the PC 10 is described in detail. The transmitter and receiver 11 of the PC 10 illustrated in FIG. 11B, which is implemented by the instructions of the CPU 501 illustrated in FIG. 5 and by the network I/F 509 illustrated in FIG. 5, transmits or receives various types of data (or information) to or from another terminal, device, or system via the communication network 100.

The acceptance unit 12, which is implemented by the instructions of the CPU 501, keyboard 511, and mouse 512, illustrated in FIG. 5, accepts various inputs from the user.

The display control 14, which is implemented by the instructions of the CPU 501 illustrated in FIG. 5, controls the display 508 to display such as a drawing image.

The storing and reading processor 19, which is implemented by the instructions of the CPU 501 and the HDD 505 illustrated in FIG. 5, performs processing to store various types of data in the memory 1000 or the recording medium 1100 or to read various types of data stored in the memory 1000 or the recording medium 1100. The recording medium 1100 is implemented by the recording medium 506 illustrated in FIG. 5.

<Operation>

In the following, operations, performed by the communication system 1, are described according to embodiments of the present disclosure. The following describes an example case in which the user A and the user B are having a meeting in a certain meeting room using the electronic whiteboard 2x, as illustrated in FIG. 1. In this example, the user A performs a login process. Further, in this example, a description is given of a case in which, while drawing an image after the login process, the user A or the user B brings his or her hand into proximity of the selection switches 223 illustrated in FIG. 15 in order to press one of the selection switches 223, but accidentally presses the power switch 222. The selection switches 223 includes a switch for switching an input interface connecting the PC 10 to the capturing device 211. Examples of this input interface include VGA, HDMI, DVI, USB (3.0), and Display Port.

When the user accidentally presses the power switch during use of the shared terminal, the shared terminal is turned off and the image data being drawn (displayed) is erased. To address such issue, the shared terminal may include a function of restoring (recovering) the image data to redisplay an image represented by the image data. However, as the shared terminal can be shared by the plurality of users, when starting a later meeting or lecture, another user can see the redisplayed image. As described below, the following shared terminal is capable of redisplaying the previous image, while ensuring the security.

<Login Process>

Figure 13:
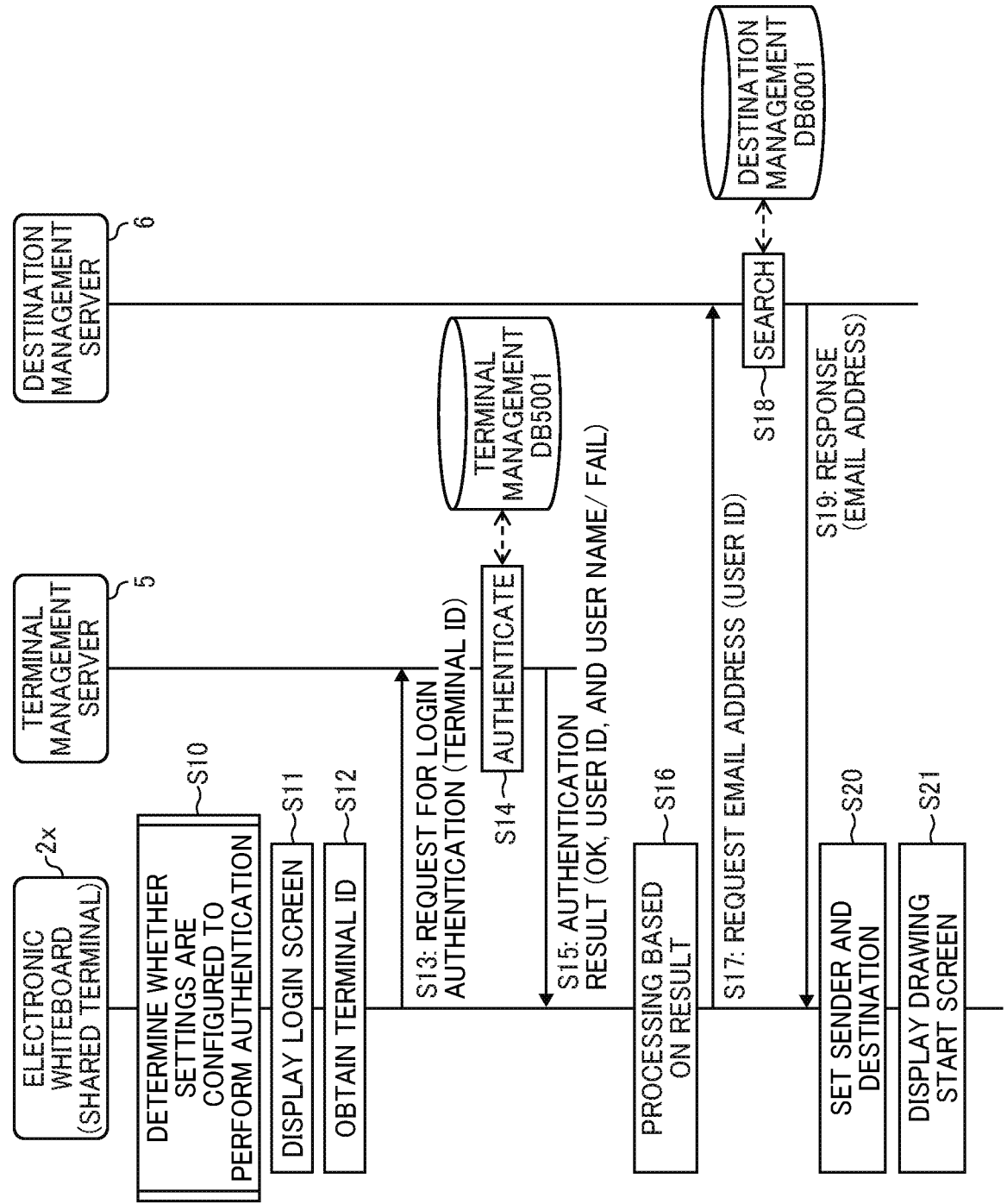
FIG. 13 is a sequence diagram illustrating a login process according to an embodiment.
Figure 14D:
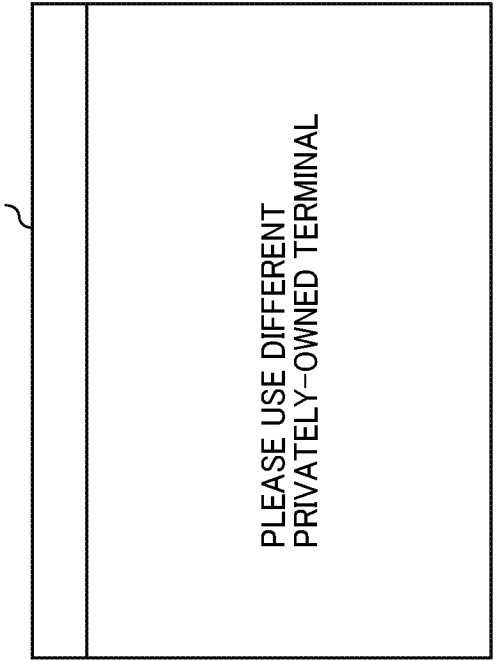
Figure 14D:
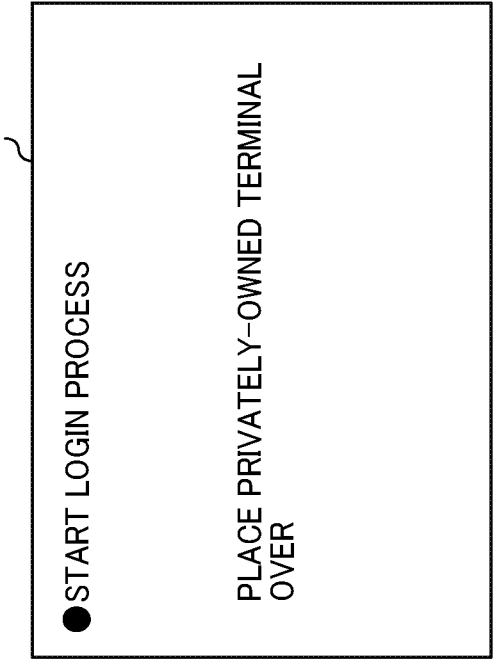
Figure 14D:
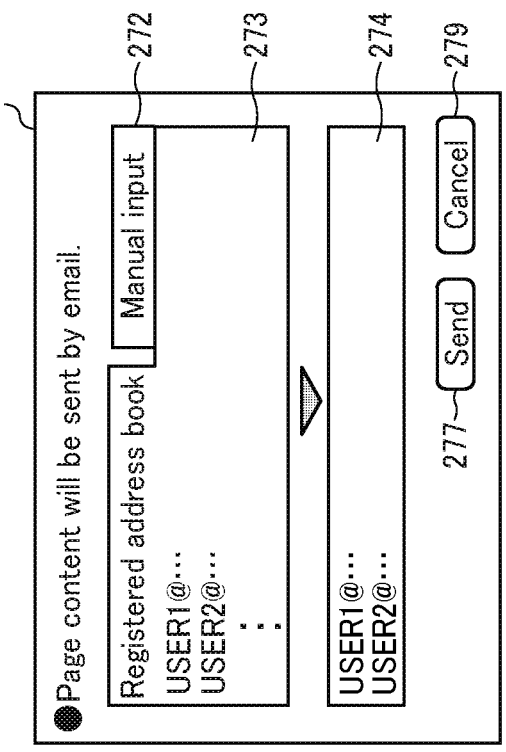
Figure 14D:
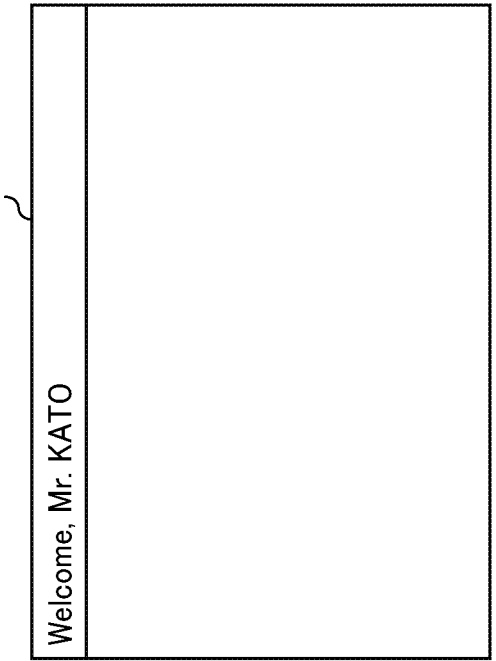
Figure 15:
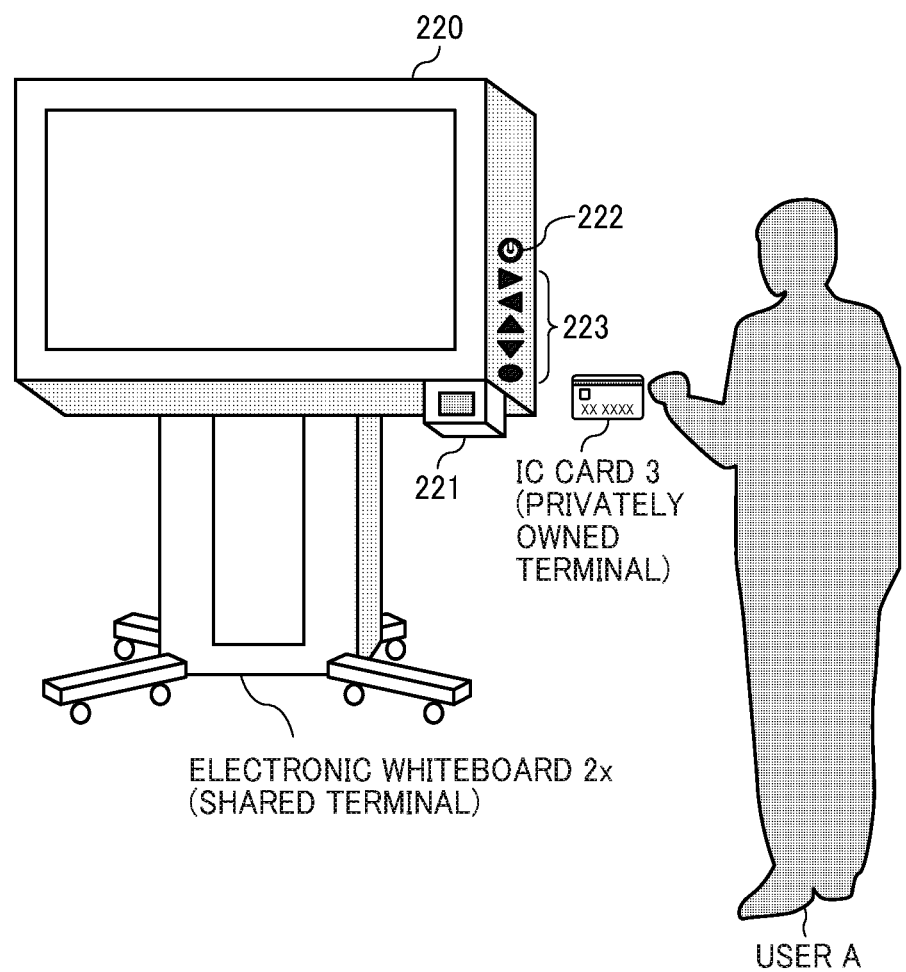
FIG. 15 is an illustration for explaining a use scenario of the electronic whiteboard, according to an embodiment.

Referring to FIGS. 13 to 16, a description is given of a login process performed by the user A to the electronic whiteboard 2x. FIG. 13 is a sequence diagram illustrating a login process according to the embodiment. FIGS. 14A, 14B, 14C and 14D each illustrates an example screen displayed on the display 220 of the electronic whiteboard 2x. FIG. 15 is an illustration for explaining a use scenario of the electronic whiteboard 2x, according to the embodiment.

As illustrated in FIG. 15, on the side surface of the housing of the display 220 of the electronic whiteboard 2x, the power switch 222 and the selection switches 223 are provided side by side in a vertical direction. This side-by-side arrangement of the power switch 222 and the selection switches 223 is due to the specification of the display 220 determined by a manufacturer of the display 220. In other words, at the time when a manufacturer of the electronic whiteboard 2 purchases the display 220 from the manufacturer of the display 220, the power switch 222 is already disposed near the selection switches 223 alongside the selection switches 223 on a same surface of the housing of the display 220. Further, at the lower right of the display 220, a near-distance communication device 221 is provided, which corresponds to the near-distance communication circuit 219. When the user brings his or her privately-owned terminal such as the IC card 3 or the smartphone 4 into proximity of the near-distance communication device 221, the obtainer and provider 28 illustrated in FIG. 11A obtains the terminal ID from the privately-owned terminal.

Figure 16:
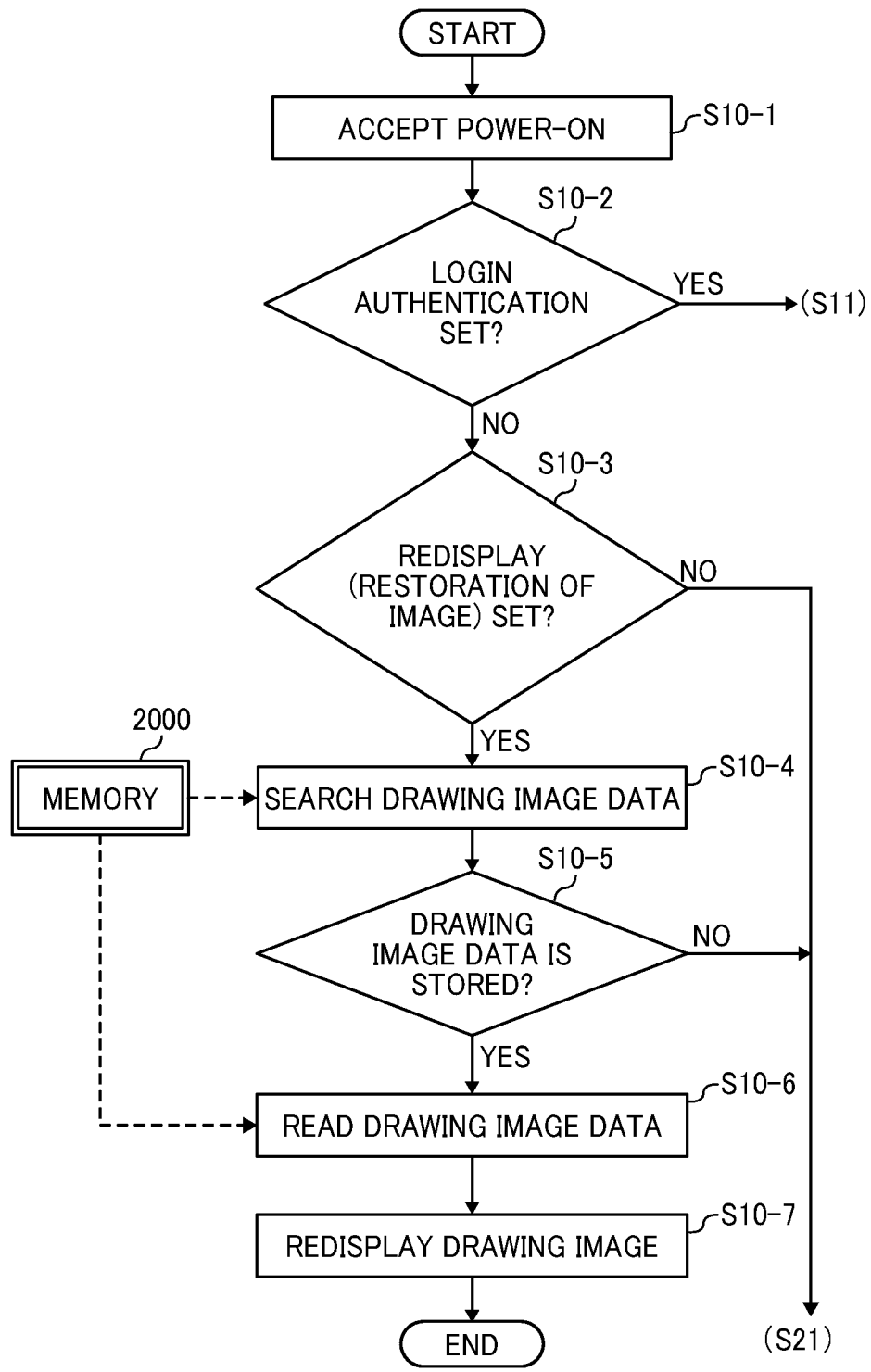
FIG. 16 is a flowchart illustrating a process of determining, when starting up, whether login authentication and redisplay are set, according to an embodiment.

When the user A presses the power switch 222 of the electronic whiteboard 2x to start a meeting, the electronic whiteboard 2x determines whether the settings indicate that login authentication is to be performed and whether the settings indicate that redisplay is to be performed, when the electronic whiteboard 2x is started up (S10). Referring to FIG. 16, processing of S10 is described in detail. FIG. 16 is a flowchart illustrating an exemplary process of checking, at a start-up, the settings of the login authentication and the redisplay.

As illustrated in FIG. 16, when the user A presses the power switch 222, the acceptance unit 22 accepts the power-on (S10-1). The determiner 25 then determines whether the electronic whiteboard 2x is set to perform the login authentication (S10-2).

When the determiner 25 determines that the settings are not configured to perform the login authentication (NO) in S10-2, the determiner 25 further determines whether the settings are configured to redisplay (restore the image) or not (S10-3). When the determiner 25 determines that the settings are configured to redisplay (YES), the storing and reading processor 29 searches the drawing image data stored in the memory 2000 (S10-4).

Subsequently, the determiner 25 determines whether the drawing image data is stored or not through the processing of S10-4 (S10-5). When the determiner 25 determines that the memory 2000 stores the drawing image data, the storing and reading processor 29 reads the drawing image data from the memory 2000 (S10-6). Based on the drawing image data read from the memory 2000, the display control 24 redisplays a drawing image on the display 220 illustrated in FIG. 15 (S10-7). Then, the user A continues to use and draw images on the electronic whiteboard 2x.

On the other hand, when the determiner 25 determines that the redisplay is not set (NO) in S10-3, the process proceeds to S21, which is described later. Additionally, when the determiner 25 determines that the memory 2000 does not store the image drawing data (NO) in S10-5, the process also proceeds to S21, which is described later.

When the determiner 25 determines that the login authentication is set (YES) in S10-2, the display control 24 displays a login screen 170 illustrated in FIG. 14A on the display 220 in S11 of FIG. 13. Now, the login process is described with reference to FIG. 13. When the user A places his or her IC card 3 into proximity to (over) the near-distance communication device 221 of the electronic whiteboard 2x as illustrated in FIG. 15 after the login screen 170 is displayed on the display 220, the obtainer and provider 28 of the electronic whiteboard 2x obtains a terminal ID of the IC card 3 from the obtainer and provider 38 of the IC card 3 (S12). The transmitter and receiver 21 of the electronic whiteboard 2x transmits the terminal management server 5 a request for the login authentication (S13). The request for login authentication includes the terminal ID that is obtained in S12. The terminal management server 5 receives the request for login authentication at the transmitter and receiver 51.

Next, the authenticator 52 of the terminal management server 5 performs the login authentication of the IC card 3 using the terminal ID that is obtained (S14). More specifically, the storing and reading processor 59 searches the terminal management table (FIG. 12A) in the terminal management DB 5001 using the terminal ID received at S13 as a search key, to obtain a user ID associated with the terminal ID. When the user ID associated with the terminal ID is found, the authenticator 52 confirms that the terminal ID of the IC card 3 is a legitimate IC card owned by the authorized user identified with the user ID that is found. When the user ID associated with the terminal ID is not found, the authenticator 52 determines that the IC card 3 (terminal ID) is not a legitimate IC card.

Next, the transmitter and receiver 51 of the terminal management server 5 transmits an authentication result to the electronic whiteboard 2x (S15). When the authenticator 52 determines that the IC card 3 is a legitimate IC card, the authentication result includes information indicating that the IC card 3 is a legitimate IC card, the user ID identifying the user who owns the IC card 3, and a user name of the user. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result.

Subsequently, the electronic whiteboard 2x performs processing based on the authentication result (S16). When the determiner 25 determines that the information included in the authentication result indicates that the IC card 3 is not a legitimate IC card, i.e., the user A is failed to login, the display control 24 causes the display 220 to display an error notification screen 180 as illustrated in FIG. 14B. When the determiner 25 determines that the information included in the authentication result indicates that the IC card 3 is a legitimate IC card, i.e., the user A successfully logs in, the transmitter and receiver 21 transmits a request for an email address (email address request) to request the destination management server 6 for an email address of the user A (S17). The email address request includes the user ID received in S15 described above. The destination management server 6 receives the email address request at the transmitter and receiver 61.

Next, the storing and reading processor 69 of the destination management server 6 searches the destination management table (FIG. 12B) in the destination management DB 6001, using the user ID received at S17 as a search key, to obtain the email address associated with the user ID (S18). The transmitter and receiver 61 transmits a response to the email address request to the electronic whiteboard 2x (S19). The response includes an email address that is read out at S18. The electronic whiteboard 2x receives the response to the email address request at the transmitter and receiver 21.

Next, the setting unit 27 of the electronic whiteboard 2x sets an email sender and an email destination (S20). Specifically, the display control 24 displays the email configuration screen 280 illustrated in FIG. 10B, in which an email address in the sender email address field 283 is switched from the email address assigned to the electronic whiteboard 2x to the email address of the user who has logged in. Further, the display control 24 displays the destination configuration screen 270 as illustrated in FIG. 10A, in which the email address of the user who has logged in is displayed in the address configuration field 274.

Further, the display control 24 controls the display 220 to display a drawing start screen 190 that includes a ticker indicating that the user can start drawing, such as "Welcome, Mr. Kato", as illustrated in FIG. 14C (S21). This text "Kato" is generated using the user name that is received at S15. Thus, the user A and the user B are able to start drawing on the electronic whiteboard 2x.

<Power-Off Process>

Referring to FIGS. 15 and 17, a description is given of a power-off process of the electronic whiteboard 2x. FIG. 17 is a flowchart illustrating a process of turning off the power.

The following describes an example case in which while the user A is drawing an image as illustrated in FIG. 8A in a meeting, the user A extends his or her arm to press at least one of the selection switches 223 on the side surface of the housing of the electronic whiteboard 2x, but accidentally presses the power switch 222. In response to pressing of the power switch 222 by the user A, the acceptance unit 22 accepts the power-off of the electronic whiteboard 2x in the same way as when the user purposely presses the power switch 222 (S31).

The determiner 25 determines that a current power-off that is accepted at S31 is caused by operation of the power switch 222 (S32). When the determiner 25 determines that the current power-off is caused by the operation of the power switch 222 (S32: YES), the determiner 25 further determines whether the login authentication is set (S33). When the determiner 25 determines that the settings are not configured to perform the login authentication (S33: NO), the determiner 25 further determines whether redisplay (restoration of the image) is set (S34). When the determiner 25 determines that the redisplay is set (YES), the memory 2000 stores the drawing image data presenting a drawing image drawn on the display 220 until right before the turn off of the electronic whiteboard 2x with the operation of the power switch 222. After S35, the power is turned off (S36). The memory 2000 is implemented with a nonvolatile memory, that is, a memory that prevents data from being erased even after the power is turned off. Accordingly, the drawing image data is saved even after the power is turned off.

On the other hand, when the determiner 25 determines that the current power-off accepted at S31 is not caused by the operation of the power switch 222, that is, the power is going to be turned off through shutdown by pressing of the "Temporarily save and exit" button 238a or the "Exit" button 238b illustrated in FIG. 8C on the screen (S32: NO), the operation proceeds to S36, and the power is turned off without saving the drawing image data, etc. Further, when the determiner 25 determines that the login authentication is set (YES) in S33, the operation proceeds to S36, and the power is turned off without saving the drawing image data, etc. Further, when the determiner 25 determines that the redisplay (restoration of the image) is not set (S34: NO), the operation proceeds to S36, and the power is turned off without saving the drawing image data.

In another example, after the acceptance of the power-off by the acceptance unit 22 at S31, the operation may proceed to S35 without performing at least one of the processes of S31 to S34.

As described above, in one or more embodiments, in order to use the electronic whiteboard 2x that can be shared by a plurality of users, login of the user with a privately-owned device such as an IC card is required. Accordingly, security is ensured.

Alternatively, according to one or more embodiments of the disclosure, there is a case where a function of the login authentication is not activated even though there is the function of the login authentication, when it is not necessary to set a security level to a high level. When the login authentication is not set and the redisplay of the image is set, a previous image is to be redisplayed. This allows a shared terminal according to the embodiment to redisplay an image that is disappeared accidentally when the user accidentally turns off the shared terminal.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A shared terminal for displaying an image to be viewed by a plurality of users on a display, the shared terminal comprising:

a memory configured to store image data; and processing circuitry configured to, accept, while displaying a previously-displayed image, an instruction to turn off the shared terminal via interaction with a software button displayed on the display and via a physical power switch located on a surface of a housing of the display, determine whether the instruction to turn off the shared terminal is received via the software button or the physical power switch, selectively store the previously-displayed image as the image data in the memory and turn off the shared terminal after storing the previously-displayed image, in response to a determination that the instruction to turn off the shared terminal was received via the physical power switch such that the processing circuitry does not store the previously-displayed image in response to a determination that the instruction to turn off the shared terminal was received via the software button, receive an instruction to turn on the shared terminal subsequent to turning off the shared terminal, and in response to the instruction to turn on the shared terminal, determine whether login authentication is enabled such that, when the login authentication is enabled, the processing circuitry is configured to require a respective one of the plurality of users to authenticate to utilize the shared terminal, determine whether redisplay of the previously-displayed image after turning on the shared terminal subsequent to turning off the shared terminal is enabled, and cause the display to redisplay the previously-displayed image in response to the instruction to turn on, when (i) the previously-displayed image is selectively stored in the memory, (ii) the login authentication is disabled and (iii) the redisplay of the previously-displayed image is enabled.

2. The shared terminal of claim 1, further comprising:

the housing to accommodate the display, wherein the physical power switch is provided on the surface of the housing that is a same surface where a selection switch to select operation on a screen of the display is provided.

3. The shared terminal of claim 2, wherein the physical power switch and the selection switch are provided side by side on the surface of the housing.

4. The shared terminal of claim 1, wherein the processing circuitry receives an instruction to turn off by operation on a screen of the display.

5. The shared terminal of claim 1, wherein the processing circuitry is configured to selectively store the previously-displayed image as the image data in the memory in response to the determination that the instruction to turn off the shared terminal was received via the physical power switch, when the login authentication is disabled and the redisplay of the image being displayed before powering off the shared terminal is enabled.

6. The shared terminal of claim 5, wherein the processing circuitry is configured to,
read the image data from the memory in response to the instruction to turn on the shared terminal, when the image data is stored in the memory, and
cause the display to redisplay the image that was displayed before powering off the shared terminal based on the image data read from the memory.

7. The shared terminal of claim 1, wherein the shared terminal is an electronic whiteboard.

8. A communication system, comprising:
the shared terminal of claim 1; and
a terminal management server configured to receive a request for the login authentication from the shared terminal via a network and perform the login authentication.

9. A display control method of a shared terminal, the shared terminal, the display control method comprising:
accepting, while displaying a previously-displayed image, an instruction to turn off the shared terminal via interaction with a software button displayed on a display and via a physical power switch located on a surface of a housing of the display;
determining whether the instruction to turn off the shared terminal is received via the software button or the physical power switch;
selectively storing the previously-displayed image as image data in a memory and turning off the shared terminal after storing the previously-displayed image, in response to a determination that the instruction to turn off the shared terminal was received via the physical power switch such that the selectively storing does not store the previously-displayed image in response to a determination that the instruction to turn off the shared terminal was received via the software button;
receiving an instruction to turn on the shared terminal subsequent to turning off the shared terminal; and
in response to the instruction to turn on the shared terminal,
determining whether login authentication is enabled such that, when the login authentication is enabled, the shared terminal is configured to require a respective one of a plurality of users to authenticate to utilize the shared terminal,
determining whether redisplay of the previously-displayed image after turning on the shared terminal subsequent to turning off the shared terminal is enabled, and
causing a display to redisplay the previously-displayed image in response to the instruction to turn on the shared terminal, when (i) the previously-displayed image is selectively stored in the memory, (ii) the login authentication is disabled and (iii) the redisplay of the previously-displayed image is enabled.

10. A non-transitory recording medium storing a plurality of instructions which, when executed by one or more processors of a shared terminal that further includes a memory configured to store image data, cause the one or more processors of the shared terminal to,
accept, while displaying a previously-displayed image, an instruction to turn off the shared terminal via interaction with a software button displayed on a display and via a physical power switch located on a surface of a housing of the display,
determine whether the instruction to the off the shared terminal is received via the software button or the physical power switch,
selectively store the previously-displayed image as the image data in the memory and turn off the shared terminal after storing the previously-displayed image, in response to a determination that the instruction to turn off the shared terminal was received via the physical power switch such that the one or more processors do not store the previously-displayed image in response to a determination that the instruction to turn off the shared terminal was received via the software button,
receive an instruction to turn on the shared terminal subsequent to turning off the shared terminal, and
in response to the instruction to turn on the shared terminal,
determine whether login authentication is enabled such that, when the login authentication is enabled, the shared terminal is configured to require a respective one of a plurality of users to authenticate to utilize the shared terminal,
determine whether redisplay of the previously-displayed image after turning on the shared terminal subsequent to turning off the shared terminal is enabled, and
cause the display to redisplay the previously-displayed image in response to the instruction to turn on the shared terminal, when (i) the previously-displayed image is selectively stored in the memory, (ii) the login authentication is disabled and (iii) the redisplay of the previously-displayed image is enabled.

* * * * *